United States Patent
Hu

(10) Patent No.: US 11,947,078 B2
(45) Date of Patent: Apr. 2, 2024

(54) CAMERA OPTICAL LENS

(71) Applicant: Changzhou Raytech Optronics Co., Ltd., Changzhou (CN)

(72) Inventor: Tiantian Hu, Shenzhen (CN)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 595 days.

(21) Appl. No.: 17/134,174

(22) Filed: Dec. 25, 2020

(65) Prior Publication Data
US 2022/0075146 A1 Mar. 10, 2022

(30) Foreign Application Priority Data
Sep. 8, 2020 (CN) .......................... 202010931545.X

(51) Int. Cl.
*G02B 9/64* (2006.01)
*G02B 13/00* (2006.01)
*G02B 13/06* (2006.01)
*G02B 13/18* (2006.01)

(52) U.S. Cl.
CPC ........... *G02B 13/0045* (2013.01); *G02B 9/64* (2013.01); *G02B 13/06* (2013.01); *G02B 13/18* (2013.01)

(58) Field of Classification Search
CPC ... G02B 3/02; G02B 9/62; G02B 9/64; G02B 13/06; G02B 13/18; G02B 13/0045; G02B 15/146; G02B 27/0025; H04N 5/222; H04N 5/2254; H04N 23/55
USPC ............... 359/656–658, 681, 708, 713, 749, 359/756–759, 761, 762
See application file for complete search history.

(56) References Cited

U.S. PATENT DOCUMENTS

| | | | | |
|---|---|---|---|---|
| 2020/0209593 A1* | 7/2020 | Hirano | ............... | G02B 13/0045 |
| 2020/0209594 A1* | 7/2020 | Hirano | ..................... | G02B 9/64 |
| 2020/0271898 A1* | 8/2020 | Hirano | ..................... | G02B 9/64 |

FOREIGN PATENT DOCUMENTS

CN 111487748 A * 8/2020 ........... G02B 13/002

\* cited by examiner

*Primary Examiner* — Wyatt A Stoffa
*Assistant Examiner* — Daniel Jeffery Jordan
(74) *Attorney, Agent, or Firm* — W&G Law Group

(57) ABSTRACT

A camera optical lens is provided. The camera optical lens includes, from an object side to an image side, a first lens, a second lens, a third lens, a fourth lens, a fifth lens, a sixth lens, a seventh lens, an eighth lens, and a ninth lens. The camera optical lens satisfies the following conditions: $0.90 \le f1/f \le 2.00$; and $2.50 \le d13/d14 \le 12.00$, where f denotes a focal length of the camera optical lens, f1 denotes a focal length of the first lens, d13 denotes an on-axis thickness of the seventh lens, and d14 denotes an on-axis distance from an image side surface of the seventh lens to an object side surface of the eighth lens. The camera optical lens according to the present invention has better optical performance while satisfying design requirements for ultra-thin, wide-angle lenses having large apertures.

10 Claims, 9 Drawing Sheets

CAMERA OPTICAL LENS

TECHNICAL FIELD

The present invention relates to the field of an optical lens, and in particular to a camera optical lens applicable to portable terminal devices such as smart phones or digital cameras, and camera devices such as monitors or PC lenses.

BACKGROUND

With the emergence of smart phones in recent years, the demand for miniature camera lens has increased. However, a photosensitive device of general camera lens is either a Charge Coupled Device (CCD) or a Complementary Metal-Oxide Semiconductor Sensor (CMOS Sensor). With the progress of the semiconductor manufacturing technology, the pixel size of the photosensitive device becomes smaller. In addition, the current electronic products have been developed to have better functions, lighter weight and smaller dimensions. Therefore, a miniature camera lens with good imaging quality has already become mainstream in the current market.

In order to obtain better imaging quality, a traditional lens module equipped in a mobile phone camera usually adopts a three-lens or four-lens structure, or even a five-lens or six-lens structure. However, with the development of technologies and the increase of the various demands of users, a nine-lens structure gradually appears in lens designs as the pixel area of the photosensitive devices is constantly reduced and the requirement of the system on the imaging quality is constantly improved. Although the common nine-lens already has better optical performance, its configurations on refractive power, lens spacing, and lens shape still need to be optimized to some extent. As a result, the lens structure cannot meet design requirements for ultra-thin, wide-angle lenses having a big aperture while achieving a good optical performance.

SUMMARY

In view of the above problems, the present invention provides a camera optical lens, which meets design requirements for large aperture, ultra-thinness and wide angle while achieving good optical performance.

Embodiments of the present invention provide a camera optical lens. The camera optical lens includes, from an object side to an image side:

a first lens;
a second lens having negative refractive power;
a third lens;
a fourth lens;
a fifth lens;
a sixth lens;
a seventh lens;
an eighth lens; and
a ninth lens,
wherein the camera optical lens satisfies following conditions:

$0.90 \leq f1/f \leq 2.00$; and $2.50 \leq d13/d14 \leq 12.00$, where
f denotes a focal length of the camera optical lens,
f1 denotes a focal length of the first lens,
d13 denotes an on-axis thickness of the seventh lens, and
d14 denotes an on-axis distance from an image side surface of the seventh lens to an object side surface of the eighth lens.

As an improvement, the camera optical lens further satisfies:

$1.50 \leq f5/f \leq 7.50$, where f5 denotes a focal length of the fifth lens.

As an improvement, the camera optical lens further satisfies following conditions:

$-8.82 \leq (R1+R2)/(R1-R2) \leq -0.93$; and $0.03 \leq d1/TTL \leq 0.20$, where
R1 denotes a central curvature radius of an object side surface of the first lens,
R2 denotes a central curvature radius of an image side surface of the first lens,
d1 denotes an on-axis thickness of the first lens, and
TTL denotes a total optical length from the object side surface of the first lens to an image plane of the camera optical lens along an optic axis.

As an improvement, the camera optical lens further satisfies following conditions:

$-328.93 \leq f2/f \leq -1.41$;

$2.23 \leq (R3+R4)/(R3-R4) \leq 85.16$; and $0.02 \leq d3/TTL \leq 0.06$.

where
f2 denotes a focal length of the second lens,
R3 denotes a central curvature radius of an object side surface of the second lens,
R4 denotes a central curvature radius of an image side surface of the second lens,
d3 denotes an on-axis thickness of the second lens, and
TTL denotes a total optical length from an object side surface of the first lens to an image plane of the camera optical lens along an optic axis.

As an improvement, the camera optical lens further satisfies following conditions:

$-5.02 \leq f3/f \leq 2.43$;

$-12.40 \leq (R5+R6)/(R5-R6) \leq 8.18$; and $0.01 \leq d5/TTL \leq 0.07$, where
f3 denotes a focal length of the third lens,
R5 denotes a central curvature radius of an object side surface of the third lens,
R6 denotes a central curvature radius of an image side surface of the third lens,
d5 denotes an on-axis thickness of the third lens, and
TTL denotes a total optical length from an object side surface of the first lens to an image plane of the camera optical lens along an optic axis.

As an improvement, the camera optical lens further satisfies following conditions:

$4.68 \leq f4/f \leq 2453.34$;

$-3630.80 \leq (R7+R8)/(R7-R8) \leq 242.30$; and $0.01 \leq d7/TTL \leq 0.09$, where
f4 denotes a focal length of the fourth lens, R7 denotes a central curvature radius of an object side surface of the fourth lens, R8 denotes a central curvature radius of an image side surface of the fourth lens, d7 denotes an on-axis thickness of the fourth lens, and TTL denotes a total optical length from an object side surface of the first lens to an image plane of the camera optical lens along an optic axis.

As an improvement, the camera optical lens further satisfies following conditions:

$-3.59 \leq (R9+R10)/(R9-R10) \leq 0.85$; and $0.03 \leq d9/TTL \leq 0.10$.

where

R9 denotes a central curvature radius of an object side surface of the fifth lens, R10 denotes a central curvature radius of an image side surface of the fifth lens, d9 denotes an on-axis thickness of the fifth lens, and TTL denotes a total optical length from an object side surface of the first lens to an image plane of the camera optical lens along an optic axis.

As an improvement, the camera optical lens further satisfies following conditions:

$-3.51 \leq f6/f \leq 8.56$;

$-4.09 \leq (R11+R12)/(R11-R12) \leq -0.51$; and $0.02 \leq d11/TTL \leq 0.09$.

where f6 denotes a focal length of the sixth lens,

R11 denotes a central curvature radius of an object side surface of the sixth lens, R12 denotes a central curvature radius of an image side surface of the sixth lens, d11 denotes an on-axis thickness of the sixth lens, and TTL denotes a total optical length from an object side surface of the first lens to an image plane of the camera optical lens along an optic axis.

As an improvement, the camera optical lens further satisfies following conditions:

$-17.19 \leq f7/f \leq -1.62$;

$-12.12 \leq (R13+R14)/(R13-R14) \leq -2.36$; and $0.03 \leq d13/TTL \leq 0.10$.

where f7 denotes a focal length of the seventh lens,

R13 denotes a central curvature radius of an object side surface of the seventh lens, R14 denotes a central curvature radius of the image side surface of the seventh lens, and TTL denotes a total optical length from an object side surface of the first lens to an image plane of the camera optical lens along an optic axis.

As an improvement, the camera optical lens further satisfies following conditions:

$0.48 \leq f8/f \leq 1.77$;

$-6.67 \leq (R15+R16)/(R15-R16) \leq -0.76$; and $0.03 \leq d15/TTL \leq 0.14$.

where f8 denotes a focal length of the eighth lens,

R15 denotes a central curvature radius of the object side surface of the eighth lens, R16 denotes a central curvature radius of an image side surface of the eighth lens, d15 denotes an on-axis thickness of the eighth lens, and TTL denotes a total optical length from an object side surface of the first lens to an image plane of the camera optical lens along an optic axis.

As an improvement, the camera optical lens further satisfies following conditions:

$-1.66 \leq f9/f \leq -0.50$;

$0.06 \leq (R17+R18)/(R17-R18) \leq 0.38$; and $0.04 \leq d17/TTL \leq 0.14$, where f9 denotes a focal length of the ninth lens, R17 denotes a central curvature radius of an object side surface of the ninth lens, R18 denotes a central curvature radius of an image side surface of the ninth lens, d17 denotes an on-axis thickness of the ninth lens, and TTL denotes a total optical length from an object side surface of the first lens to an image plane of the camera optical lens along an optic axis.

The present invention has the following beneficial effects. The camera optical lens according to the present invention has excellent optical performance while achieving the characteristics of large aperture, wide angle and ultra-thinness, particularly applicable to camera lens assembly of mobile phones and WEB camera lenses composed of CCD, CMOS, and other camera elements for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Embodiments of the present invention will hereinafter be described in detail with reference to the accompanying drawings to make the purpose, technical solutions, and advantages of the present invention clearer. However, those skilled in the art can understand that many technical details described hereby in each embodiment of the present invention are only to provide a better comprehension of the present invention. Even without these technical details and various changes and modifications based on the following embodiments, the technical solutions of the present invention may also be implemented.

Embodiment 1

Figure 1:
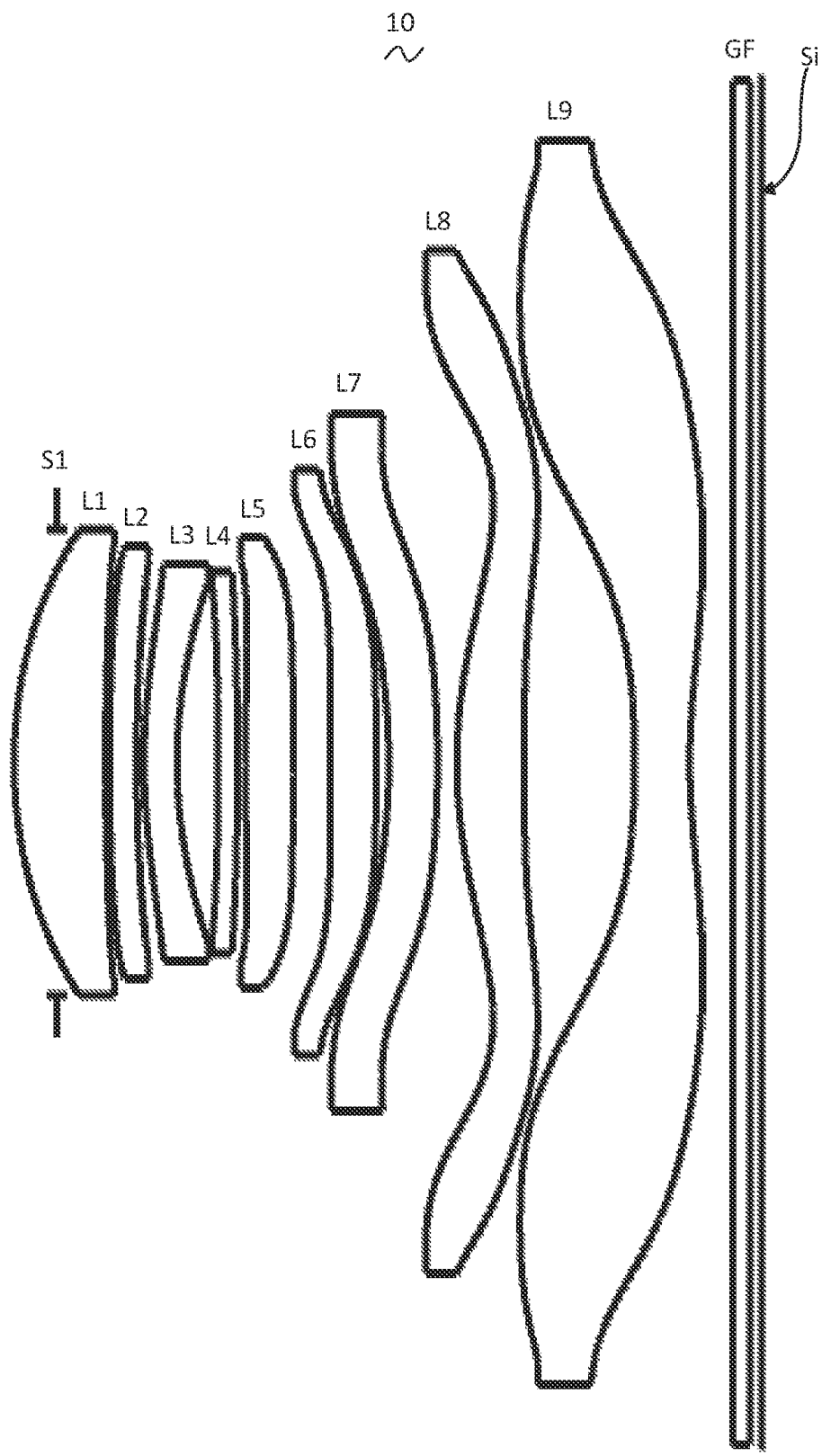
FIG. 1 is a schematic structural diagram of a camera optical lens according to Embodiment 1 of the present invention.
Figure 2:
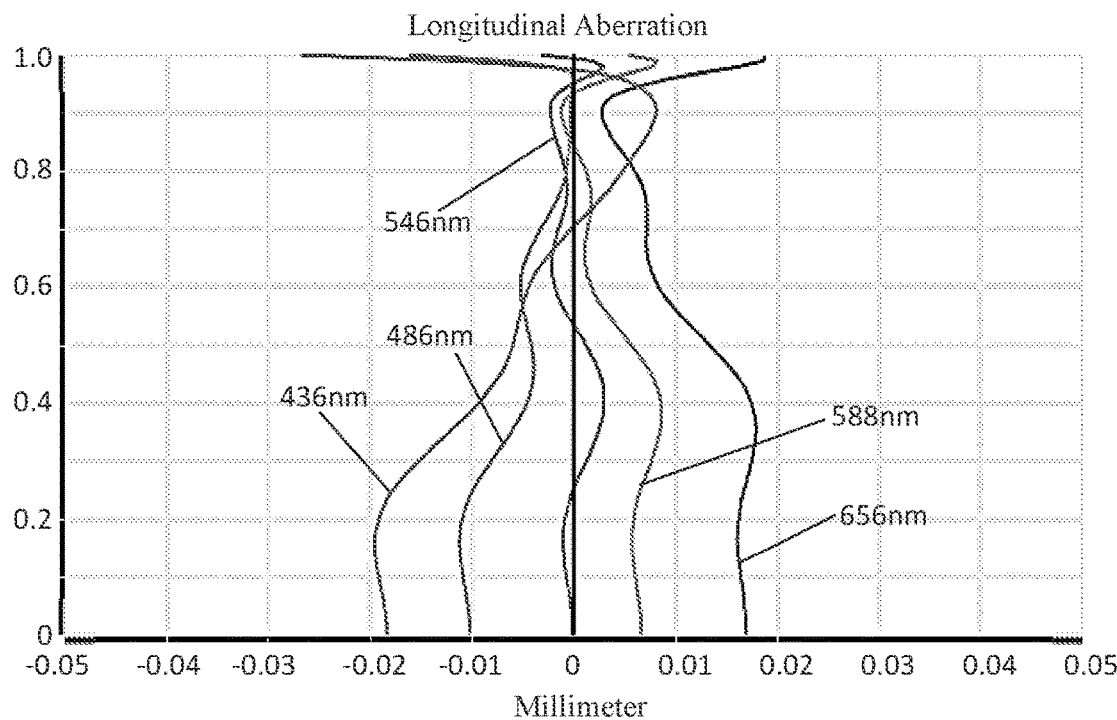
FIG. 2 is a schematic diagram of longitudinal aberration of the camera optical lens shown in FIG. 1.
Figure 3:
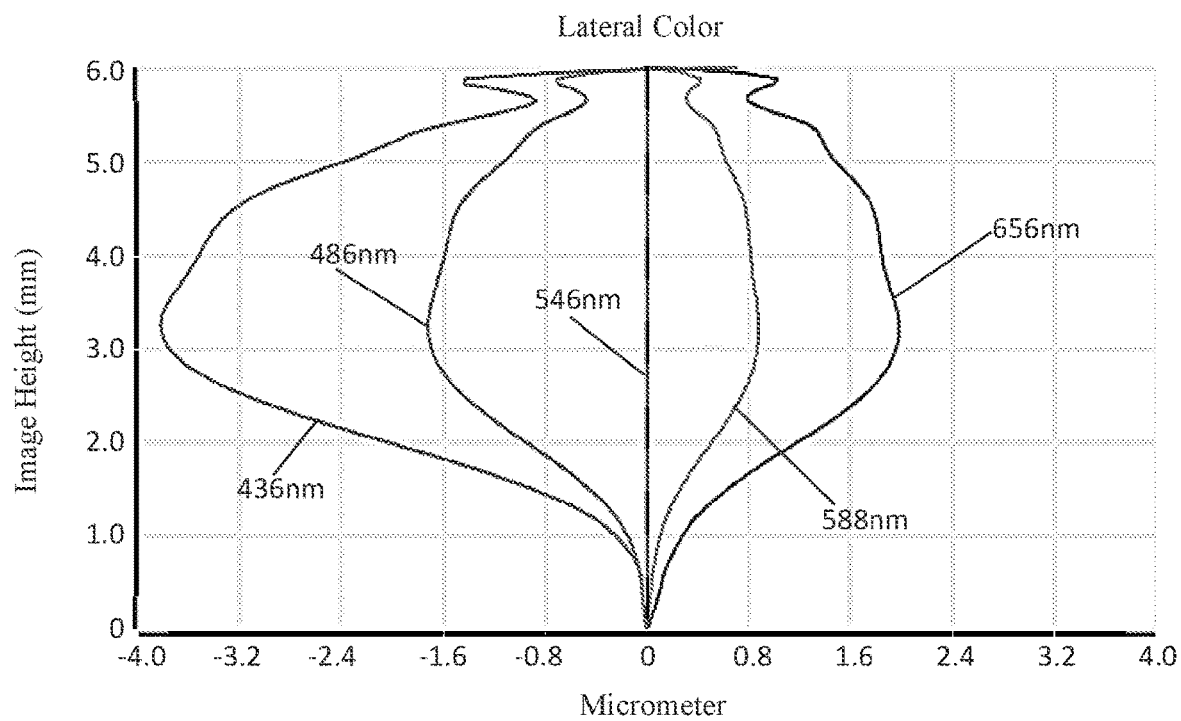
FIG. 3 is a schematic diagram of lateral color of the camera optical lens shown in FIG. 1.

Referring to the drawings, the present invention provides a camera optical lens 10. FIG. 1 illustrates the camera optical lens 10 according to Embodiment 1 of the present invention. The camera optical lens 10 includes nine lenses. The camera optical lens 10 successively includes, from an object side to an image side, an aperture S1, a first lens L1, a second lens L2, a third lens L3, a fourth lens L4, a fifth lens L5, a sixth lens L6, a seventh lens L7, an eighth lens L8, and a ninth lens L9. An optical element such as an optical filter GF may be provided between the ninth lens L9 and an image plane Si.

In this embodiment, the first lens L1 has positive refractive power, the second lens L2 has negative refractive power, the third lens L3 has negative refractive power, the fourth lens L4 has positive refractive power, the fifth lens L5 has positive refractive power, the sixth lens L6 has positive refractive power, the seventh lens L7 has negative refractive power, the eighth lens L8 has positive refractive power, and the ninth lens L9 has negative refractive power. It should be appreciated that, in other embodiments, the third lens L3, the fourth lens L4, the fifth lens L5, the sixth lens L6, the seventh lens L7, the eighth lens L8, and the ninth lens L9 may also have other refractive power.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, the eighth lens L8 is made of a plastic material, and the ninth lens L9 is made of a plastic material. In other optional embodiments, each of the lenses may also be made of other material.

In this embodiment, a focal length of the camera optical lens 10 is defined as f, a focal length of the first lens L1 is defined as f1. The camera optical lens further satisfies a condition of $0.90 \leq f1/f \leq 2.00$, which specifies a ratio of the focal length f1 of the first lens to the focal length f of the camera optical lens 10. When the condition is satisfied, spherical aberration and field curvature of the system may be effectively balanced.

An on-axis thickness of the seventh lens L7 is defined as d13, and an on-axis distance from an image side surface of the seventh lens L7 to an object side surface of the eighth lens L8 is defined as d14. The camera optical lens further satisfies a condition of $2.50 \leq d13/d14 \leq 12.00$, which specifies a ratio of the on-axis thickness of the seventh lens L7 to an air spacing between the seventh lens L7 and the eighth lens L8. This condition facilitates reducing a total length of the optical system, thereby achieving an ultra-thin effect.

The focal length of the camera optical lens 10 is defined as f, and a focal length of the fifth lens L5 is defined as f5. The camera optical lens further satisfies a condition of $1.50 \leq f5/f \leq 7.50$, which specifies a ratio of the focal length of the fifth lens L5 to a total focal length of the system. The system therefore has a better imaging quality and a lower sensitivity by reasonably controlling the focal lengths.

In this embodiment, an object side surface of the first lens L1 is a convex surface at a paraxial position, and an image side surface of the first lens L1 is a concave surface at the paraxial position.

A central curvature radius of the object side surface of the first lens L1 is defined as R1, and a central curvature radius of the image side surface of the first lens L1 is defined as R2. The camera optical lens further satisfies a condition of $-8.82 \leq (R1+R2)/(R1-R2) \leq 0.93$. This condition can reasonably control the shape of the first lens L1 such that the first lens L1 can effectively correct spherical aberration of the system. As an example, the camera optical lens satisfies a condition of $-5.51 \leq (R1+R2)/(R1-R2) \leq -1.16$.

An axial thickness of the first lens L1 is defined as d1, and a total optical length from the object side surface of the first lens to an image plane of the camera optical lens 10 along an optic axis is defined as TTL. The camera optical lens further satisfies a condition of $0.03 \leq d1/TTL \leq 0.20$. This condition can facilitate achieving ultra-thin lenses. As an example, the camera optical lens satisfies a condition of $0.04 \leq d1/TTL \leq 0.16$.

In this embodiment, an object side surface of the second lens L2 is a convex surface at the paraxial position, and an image side surface of the second lens L2 is a concave surface at the paraxial position.

A focal length of the camera optical lens 10 is defined as f, and a focal length of the second lens L2 is defined as f2. The camera optical lens satisfies a condition of $-328.93 \leq f2/f \leq -1.41$. This condition can facilitate aberration correction of the optical system by controlling positive refractive power of the second lens L2 within a reasonable range. As an example, the camera optical lens 10 satisfies a condition of $-205.58 \leq f2/f \leq -1.77$.

A central curvature radius of the object side surface of the second lens L2 is defined as R3, and a central curvature radius of the image side surface of the second lens L2 is defined as R4. The camera optical lens satisfies a condition of $2.23 \leq (R3+R4)/(R3-R4) \leq 85.16$, which specifies a shape of the second lens L2. This condition can facilitate correcting the on-axis aberration with development of ultra-thin and wide-angle lenses. As an example, the camera optical lens 10 satisfies a condition of $3.57 \leq (R3+R4)/(R3-R4) \leq 68.12$.

An on-axis thickness of the second lens L2 is defined as d3, and a total optical length from the object side surface of the first lens to an image plane of the camera optical lens 10 along an optic axis is defined as TTL. The camera optical lens 10 satisfies a condition of $0.02 \leq d3/TTL \leq 0.06$. This condition can achieve ultra-thin lenses. As an example, the camera optical lens 10 satisfies a condition of $0.03 \leq d3/TTL \leq 0.05$.

In this embodiment, an object side surface of the third lens L3 is a convex surface at the paraxial position and an image side surface of the third lens L3 is a concave surface at the paraxial position.

The focal length of the camera optical lens 10 is defined as f, and a focal length of the third lens L3 is defined as f3. The camera optical lens satisfies a condition of −5.02≤f3/f≤2.43. The system therefore achieves a better imaging quality and a lower sensitivity by reasonably configuring the refractive power. As an example, the camera optical lens 10 satisfies a condition of −3.14≤f3/f≤1.94.

A central curvature radius of the object side surface of the third lens L3 is defined as R5, and a central curvature radius of the image side surface of the third lens L3 is defined as R6. The camera optical lens 10 further satisfies a condition of −12.40≤(R5+R6)/(R5−R6)≤8.18, which specifies a shape of the third lens L3. This condition can alleviate the deflection of light passing through the lens, thereby effectively reducing the aberration. As an example, the camera optical lens 10 satisfies a condition of −7.75≤(R5+R6)/(R5−R6)≤6.55.

A total optical length from the object side surface of the first lens to an image plane of the camera optical lens 10 along an optic axis is defined as TTL, and an on-axis thickness of the third lens L3 is defined as d5. The camera optical lens satisfies a condition of 0.01≤d5/TTL≤0.07. This condition can achieve ultra-thin lenses. As an example, the camera optical lens 10 satisfies a condition of 0.02≤d5/TTL≤0.05.

In this embodiment, an object side surface of the fourth lens L4 is a concave surface at the paraxial position, and an image side surface of the fourth lens L4 is a convex surface at the paraxial position.

The focal length of the camera optical lens 10 is defined as f, and a focal length of the fourth lens L4 is defined as f4. The camera optical lens 10 satisfies a condition of 4.68≤f4/f≤2453.34. The system therefore achieves a better imaging quality and a lower sensitivity by reasonably configuring the refractive power. As an example, the camera optical lens 10 satisfies a condition of 7.49≤f4/f≤1962.67.

A central curvature radius of the object side surface of the fourth lens L4 is defined as R7, and a central curvature radius of the image side surface of the fourth lens L4 is defined as R8. The camera optical lens 10 satisfies a condition of −3630.80≤(R7+R8)/(R7−R8)≤242.30, which specifies a shape of the fourth lens L4. This condition can facilitate aberration correction of an off-axis angle of view with development of ultra-thin and wide-angle lenses. As an example, the camera optical lens 10 satisfies a condition of −2269.25≤(R7+R8)/(R7−R8)≤193.84.

A total optical length from the object side surface of the first lens to an image plane of the camera optical lens 10 along an optic axis is defined as TTL, and an on-axis thickness of the fourth lens L4 is defined as d7. The camera optical lens 10 satisfies a condition of 0.01≤d7/TTL≤0.09. This condition can achieve ultra-thin lenses. As an example, the camera optical lens 10 satisfies a condition of 0.02≤d7/TTL≤0.07.

In this embodiment, an object side surface of the fifth lens L5 is a convex surface at the paraxial position, and an image side surface of the fifth lens L5 is a concave surface at the paraxial position.

A central curvature radius of the object side surface of the fifth lens L5 is defined as R9, and a central curvature radius of the image side surface of the fifth lens L5 is defined as R10. The camera optical lens 10 satisfies a condition of −3.59≤(R9+R10)/(R9−R10)≤0.85, which specifies a shape of the fifth lens L5. This condition can facilitate aberration correction of an off-axis angle of view with development of ultra-thin and wide-angle lenses. As an example, the camera optical lens 10 satisfies a condition of −2.24≤(R9+R10)/(R9−R10)≤0.68.

A total optical length from the object side surface of the first lens to an image plane of the camera optical lens 10 along an optic axis is defined as TTL, and an on-axis thickness of the fifth lens L5 is defined as d9. The camera optical lens satisfies a condition of 0.03≤d9/TTL≤0.10. This condition can achieve ultra-thin lenses. As an example, the camera optical lens 10 satisfies a condition of 0.05≤d9/TTL≤0.08.

In this embodiment, an object side surface of the sixth lens L6 is a convex surface at the paraxial position, and an image side surface of the sixth lens L6 is a convex surface at the paraxial position.

The focal length of the camera optical lens 10 is defined as f, and a focal length of the sixth lens L6 is defined as f6. The camera optical lens satisfies a condition of −3.51≤f6/f≤8.56. The system therefore achieves a better imaging quality and a lower sensitivity by reasonably configuring the refractive power. As an example, the camera optical lens 10 satisfies a condition of −2.19≤f6/f≤6.84.

A central curvature radius of the object side surface of the sixth lens L6 is defined as R11, and a central curvature radius of the image side surface of the sixth lens L6 is defined as R12. The camera optical lens satisfies a condition of −4.09≤(R11+R12)/(R11−R12)≤−0.51, which specifies a shape of the sixth lens L6. This condition can facilitate aberration correction of an off-axis angle of view with development of ultra-thin and wide-angle lenses. As an example, the camera optical lens 10 satisfies a condition of −2.55≤(R11+R12)/(R11−R12)≤−0.63.

A total optical length from the object side surface of the first lens to an image plane of the camera optical lens 10 along an optic axis is defined as TTL, and an on-axis thickness of the sixth lens L6 is defined as d11. The camera optical lens satisfies a condition of 0.02≤d11/TTL≤0.09. This condition can achieve ultra-thin lenses. As an example, the camera optical lens 10 satisfies a condition of 0.04≤d11/TTL≤0.07.

In this embodiment, an object side surface of the seventh lens L7 is a concave surface at the paraxial position, and an image side surface of the seventh lens L7 is a convex surface at the paraxial position.

The focal length of the camera optical lens 10 is defined as f, and a focal length of the seventh lens L7 is defined as f7. The camera optical lens satisfies a condition of: −17.19≤f7/f≤−1.62. The system therefore achieves a better imaging quality and a lower sensitivity by reasonably configuring the refractive power. As an example, the camera optical lens 10 satisfies a condition of −10.75≤f7/f≤−2.03.

A central curvature radius of the object side surface of the seventh lens L7 is defined as R13, and a central curvature radius of the image side surface of the seventh lens L7 is defined as R14. The camera optical lens satisfies a condition of −12.12≤(R13+R14)/(R13−R14)≤−2.36, which specifies a shape of the seventh lens L7. This condition can facilitate aberration correction of an off-axis angle of view with development of ultra-thin and wide-angle lenses. As an example, the camera optical lens 10 satisfies a condition of −7.57 (R13+R14)/(R13−R14)≤−2.95.

A total optical length from the object side surface of the first lens to an image plane of the camera optical lens 10 along an optic axis is defined as TTL, and an on-axis thickness of the seventh lens L7 is defined as d13. The camera optical lens satisfies a condition of 0.03≤d13/

TTL≤0.10. This condition can achieve ultra-thin lenses. As an example, the camera optical lens 10 satisfies a condition of 0.04≤d13/TTL≤0.08.

In this embodiment, an object side surface of the eighth lens L8 is a convex surface at the paraxial position, and an image side surface of the eighth lens L8 is a concave surface at the paraxial position.

The focal length of the camera optical lens 10 is defined as f, and a focal length of the eighth lens L8 is defined as f8. The camera optical lens 10 satisfies a condition of: 0.48≤f8/f≤1.77. The system therefore achieves a better imaging quality and a lower sensitivity by reasonably configuring the refractive power. As an example, the camera optical lens 10 satisfies a condition of 0.77≤f8/f≤1.41.

A central curvature radius of the object side surface of the eighth lens L8 is defined as R15, and a central curvature radius of the image side surface of the eighth lens L8 is defined as R16. The camera optical lens satisfies a condition of −6.67≤(R15+R16)/(R15−R16)≤−0.76, which specifies a shape of the eighth lens. This condition can facilitate aberration correction of an off-axis angle of view with development of ultra-thin and wide-angle lenses. As an example, the camera optical lens 10 satisfies a condition of −4.17≤(R15+R16)/(R15−R16)≤−0.95.

A total optical length from the object side surface of the first lens to an image plane of the camera optical lens 10 along an optic axis is defined as TTL, and an on-axis thickness of the eighth lens L8 is defined as d15. The camera optical lens satisfies a condition of 0.03≤d15/TTL≤0.14. This condition can achieve ultra-thin lenses. As an example, the camera optical lens 10 satisfies a condition of 0.05≤d15/TTL≤0.11.

In this embodiment, an object side surface of the ninth lens L9 is a concave surface at the paraxial position, and an image side surface of the ninth lens L9 is a concave surface at the paraxial position. It should be understood that, in other embodiments, profiles of the object side surfaces and the image side surfaces of the first lens L1, the second lens L2, the third lens L3, the fourth lens L4, the fifth lens L5, the sixth lens L6, the seventh lens L7, the eighth lens L8 and the ninth lens L9 may also be arranged in other concave and convex configurations.

The focal length of the camera optical lens 10 is defined as f, and a focal length of the ninth lens L9 is defined as f9. The camera optical lens satisfies a condition of −1.66≤f9/f≤−0.50. The system therefore achieves a better imaging quality and a lower sensitivity by reasonably configuring the refractive power. As an example, the camera optical lens 10 satisfies a condition of a condition of −1.04≤f9/f≤−0.62.

A central curvature radius of the object side surface of the ninth lens L9 is defined as R17, and a central curvature radius of the image side surface of the ninth lens L9 is defined as R18. The camera optical lens satisfies a condition of 0.06≤(R17+R18)/(R17−R18)≤0.38, which specifies a shape of the ninth lens. This condition can facilitate aberration correction of an off-axis angle of view with development of ultra-thin and wide-angle lenses. As an example, the camera optical lens 10 satisfies a condition of 0.10≤(R17+R18)/(R17−R18)≤0.31.

A total optical length from the object side surface of the first lens to an image plane of the camera optical lens 10 along an optic axis is defined as TTL, and an on-axis thickness of the ninth lens L9 is defined as d17. The camera optical lens satisfies a condition of 0.04≤d17/TTL≤0.14. This condition can achieve ultra-thin lenses. As an example, the camera optical lens 10 satisfies a condition of 0.06≤d17/TTL≤0.11.

In this embodiment, an image height of the camera optical lens 10 is defined as IH, and a total optical length from the object side surface of the first lens to an image plane of the camera optical lens 10 along an optic axis is defined as TTL. The camera optical lens satisfies a condition of TTL/IH≤1.47, thereby achieving ultra-thin lenses.

In this embodiment, a field of view (FOV) of the camera optical lens 10 is greater than or equal to 78.00°, thereby achieving a wide angle.

In this embodiment, an F number (FNO) of the camera optical lens 10 is smaller than or equal to 2.0, thereby achieving a large aperture. The camera optical lens thus has good imaging performance.

When satisfying the above conditions, the camera optical lens 10 can meet design requirements of a large aperture, a wide angle, and ultra-thinness while having good optical performance. According to the characteristics of the camera optical lens 10, the camera optical lens 10 is particularly applicable to a mobile phone camera lens assembly and a WEB camera lens composed of high pixel CCD, CMOS, and other camera elements.

Examples of the camera optical lens 10 of the present invention are described below. Symbols described in each example will be described as follows. The focal length, on-axis distance, central curvature radius, on-axis thickness, inflexion point position, and arrest point position are all in units of mm.

TTL: a total optical length from the object side surface of the first lens to an image plane Si of the camera optical lens 10 along an optic axis, in a unit of mm.

F number (FNO): a ratio of an effective focal length of the camera optical lens to an entrance pupil diameter of the camera optical lens.

In some embodiments, at least one of the object side surface or the image side surface of each lens is provided with at least one of inflection points or arrest points to meet high-quality imaging requirements. The specific implementations can be referred to the following description.

Table 1 indicates design data of the camera optical lens 10 according to Embodiment 1 of the present invention.

TABLE 1

| | R | d | nd | vd |
|---|---|---|---|---|
| S1 | ∞ | d0 = −0.502 | | |
| R1 | 3.252 | d1 = 1.076 | nd1 1.5441 | v1 55.93 |
| R2 | 17.471 | d2 = 0.050 | | |
| R3 | 19.902 | d3 = 0.320 | nd2 1.6032 | v2 28.29 |
| R4 | 19.213 | d4 = 0.080 | | |
| R5 | 4.648 | d5 = 0.387 | nd3 1.6800 | v3 18.40 |
| R6 | 3.208 | d6 = 0.489 | | |
| R7 | −22.680 | d7 = 0.227 | nd4 1.6800 | v4 18.40 |
| R8 | −22.705 | d8 = 0.092 | | |
| R9 | 18.822 | d9 = 0.552 | nd5 1.5441 | v5 55.93 |
| R10 | 66.165 | d10 = 0.436 | | |
| R11 | 18.694 | d11 = 0.547 | nd6 1.5441 | v6 55.93 |
| R12 | −136.523 | d12 = 0.150 | | |
| R13 | −4.537 | d13 = 0.570 | nd7 1.6359 | v7 23.82 |
| R14 | −7.874 | d14 = 0.228 | | |
| R15 | 3.359 | d15 = 0.795 | nd8 1.5441 | v8 55.93 |
| R16 | 49.834 | d16 = 1.300 | | |
| R17 | −7.268 | d17 = 0.649 | nd9 1.5441 | v9 55.93 |
| R18 | 4.516 | d18 = 0.500 | | |
| R19 | ∞ | d19 = 0.210 | ndg 1.5168 | vg 64.17 |
| R20 | ∞ | d20 = 0.131 | | |

In the above table, meanings of symbols will be described as follows.

S1: aperture;

R: central curvature radius of an optical surface;

R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;
R14: central curvature radius of the image side surface of the seventh lens L7;
R15: central curvature radius of the object side surface of the eighth lens L8;
R16: central curvature radius of the image side surface of the eighth lens L8;
R17: central curvature radius of the object side surface of the ninth lens L9;
R18: central curvature radius of the image side surface of the ninth lens L9;
R19: central curvature radius of the object side surface of the optical filter GF;
R20: central curvature radius of the image side surface of the optical filter GF;
d: on-axis thickness of the lens and on-axis distance between the lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the ninth lens L9;
d17: on-axis thickness of the ninth lens L9;
d18: on-axis distance from the image side surface of the ninth lens L9 to the object side surface of the optical filter GF;
d19: on-axis thickness of the optical filter GF;
d20: on-axis distance from the image side surface of the optical filter GF to the image plane Si;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
nd7: refractive index of d-line of the seventh lens L7;
nd8: refractive index of d-line of the eighth lens L8;
nd9: refractive index of d-line of the ninth lens L9;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
v9: abbe number of the ninth lens L9; and
vg: abbe number of the optical filter GF.

Table 2 indicates aspherical surface data of each lens in the camera optical lens 10 according to the Embodiment 1 of the present invention.

TABLE 2

| | Conic coefficient | Aspherical surface coefficient | | | | |
|---|---|---|---|---|---|---|
| | k | A4 | A6 | A8 | A10 | A12 |
| R1 | 1.1534E−01 | −5.1897E−04 | 3.6696E−04 | −6.4562E−04 | 6.5778E−04 | −3.7313E−04 |
| R2 | 2.2731E+01 | −2.5309E−03 | −1.0409E−02 | 1.1247E−02 | −5.1451E−03 | 1.2123E−03 |
| R3 | −4.8466E+01 | 1.0495E−02 | −1.4297E−02 | 1.0915E−02 | −3.8124E−03 | 6.0112E−04 |
| R4 | 4.4138E+00 | 2.6904E−02 | −3.3701E−02 | 2.8933E−02 | −1.7509E−02 | 7.6490E−03 |
| R5 | −8.5166E−01 | −5.8803E−03 | −1.1959E−02 | 8.2890E−03 | −2.7109E−03 | 5.7637E−04 |
| R6 | 1.4659E+00 | −2.8102E−02 | 2.0675E−02 | −3.4097E−02 | 3.4172E−02 | −2.1035E−02 |
| R7 | −3.5936E+00 | 5.5950E−05 | −8.1722E−04 | −9.4022E−05 | −1.2845E−06 | 2.4679E−07 |
| R8 | −5.6105E+00 | 4.8779E−04 | −1.0446E−04 | 3.0702E−07 | 3.1801E−06 | −1.0303E−06 |
| R9 | 8.6794E+01 | −7.5084E−03 | −1.5037E−02 | 2.9861E−02 | −3.4167E−02 | 2.3677E−02 |
| R10 | 9.9982E+02 | −1.8180E−02 | 4.7052E−05 | 7.5281E−03 | −1.0926E−02 | 7.3471E−03 |

TABLE 2-continued

| | | | | | |
|---|---|---|---|---|---|
| R11 | 3.2527E+01 | −3.8507E−02 | 2.0982E−02 | −1.5647E−02 | 8.8266E−03 | −3.3391E−03 |
| R12 | 9.9336E+02 | −3.7143E−02 | 2.1141E−02 | −1.9757E−02 | 1.0448E−02 | −3.0900E−03 |
| R13 | −1.3520E−02 | 1.6580E−02 | −1.0778E−02 | −1.6555E−03 | 2.8293E−03 | −9.6735E−04 |
| R14 | 4.2785E+00 | −2.2367E−03 | −1.0735E−02 | 6.3606E−03 | −2.1496E−03 | 4.6787E−04 |
| R15 | −6.7576E−01 | −1.3714E−02 | 2.2227E−04 | 1.0105E−04 | −7.0311E−05 | 1.1714E−05 |
| R16 | 3.0819E+01 | 2.1037E−02 | −6.0296E−03 | 9.5976E−04 | −1.3771E−04 | 1.4697E−05 |
| R17 | −3.4997E+00 | −3.2322E−02 | 5.3096E−03 | −4.7206E−04 | 3.7378E−05 | −2.6527E−06 |
| R18 | −6.1934E−01 | −3.2182E−02 | 5.5241E−03 | −7.9032E−04 | 8.1102E−05 | −5.5212E−06 |

| | Conic coefficient | Aspherical surface coefficient | | | |
|---|---|---|---|---|---|
| | k | A14 | A16 | A18 | A20 |
| R1 | 1.1534E−01 | 1.1557E−04 | −1.8574E−05 | 1.2327E−06 | −5.4219E−09 |
| R2 | 2.2731E+01 | −1.2575E−04 | −8.0938E−07 | 6.0090E−07 | 6.8322E−08 |
| R3 | −4.8466E+01 | −2.8935E−05 | 7.4113E−06 | −4.0362E−06 | 5.3293E−07 |
| R4 | 4.4138E+00 | −2.3450E−03 | 4.6939E−04 | −5.4890E−05 | 2.9095E−06 |
| R5 | −8.5166E−01 | −1.2955E−04 | 2.5718E−05 | −2.1914E−06 | −2.4062E−08 |
| R6 | 1.4659E+00 | 8.1033E−03 | −1.9201E−03 | 2.5691E−04 | −1.4982E−05 |
| R7 | −3.5936E+00 | 1.8013E−07 | 3.5326E−07 | 1.6659E−07 | −1.5104E−08 |
| R8 | −5.6105E+00 | −1.2322E−06 | −5.3441E−07 | −6.9316E−08 | 7.7443E−08 |
| R9 | 8.6794E+01 | −1.0258E−02 | 2.7127E−03 | −4.0146E−04 | 2.5453E−05 |
| R10 | 9.9982E+02 | −2.8717E−03 | 6.6401E−04 | −8.4358E−05 | 4.5295E−06 |
| R11 | 3.2527E+01 | 7.6493E−04 | −1.0099E−04 | 7.1943E−06 | −2.2054E−07 |
| R12 | 9.9336E+02 | 5.1834E−04 | −4.7200E−05 | 2.0366E−06 | −2.7124E−08 |
| R13 | −1.3520E−02 | 1.7160E−04 | −1.7398E−05 | 9.5247E−07 | −2.1795E−08 |
| R14 | 4.2785E+00 | −6.2059E−05 | 4.8096E−06 | −2.0052E−07 | 3.4876E−09 |
| R15 | −6.7576E−01 | −8.9081E−08 | 3.5419E−08 | −7.1723E−10 | 5.8212E−12 |
| R16 | 3.0819E+01 | −9.7225E−07 | 3.7021E−08 | −7.4105E−10 | 6.0145E−12 |
| R17 | −3.4997E+00 | 1.3354E−07 | −4.1251E−09 | 6.9683E−11 | −4.9383E−13 |
| R18 | −6.1934E−01 | 2.3846E−07 | −6.2550E−09 | 9.1000E−11 | −5.6455E−13 |

In Table 2, k is a conic coefficient, and A4, A6, A8, A10, A12, A14, A16, A18, and A20 are aspherical surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1),$$

where x is a vertical distance between a point on an aspherical curve and the optic axis, and y is an aspherical depth (a vertical distance between a point on an aspherical surface at a distance of X from the optic axis and a surface tangent to a vertex of the aspherical surface on the optic axis).

In the present embodiment, an aspherical surface of each lens surface uses the aspherical surface represented by the above formula (1). However, the present invention is not limited to the aspherical polynomial form represented by the formula (1).

Table 3 and Table 4 indicate design data of inflexion points and arrest points of each lens in the camera optical lens 10 according to the Embodiment 1 of the present invention. P1R1 and P1R2 represent the object side surface and the image side surface of the first lens L1, respectively; P2R1 and P2R2 represent the object side surface and the image side surface of the second lens L2, respectively. P3R1 and P3R2 represent the object side surface and the image side surface of the third lens L3, respectively. P4R1 and P4R2 represent the object side surface and the image side surface of the fourth lens L4, respectively. P5R1 and P5R2 represent the object side surface and the image side surface of the fifth lens L5, respectively. P6R1 and P6R2 represent the object side surface and the image side surface of the sixth lens L6, respectively. P7R1 and P7R2 represent the object side surface and the image side surface of the seventh lens L7, respectively. P8R1 and P8R2 represent the object side surface and the image side surface of the eighth lens L8, respectively. P9R1 and P9R2 represent the object side surface and the image side surface of the ninth lens L9, respectively. The data in the "inflexion point position" column refers to vertical distances from the inflexion point arranged on each lens surface to the optic axis of the camera optical lens 10. The data in the "arrest point position" column refers to vertical distance from the arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 1 | 1.395 | / | / |
| P3R2 | 0 | / | / | / |
| P4R1 | 0 | / | / | / |
| P4R2 | 0 | / | / | / |
| P5R1 | 1 | 0.695 | / | / |
| P5R2 | 1 | 0.275 | / | / |
| P6R1 | 3 | 0.375 | 2.055 | 2.375 |
| P6R2 | 2 | 2.125 | 2.555 | / |
| P7R1 | 1 | 1.825 | / | / |
| P7R2 | 1 | 2.015 | / | / |
| P8R1 | 2 | 1.435 | 3.305 | / |
| P8R2 | 2 | 1.655 | 4.335 | / |
| P9R1 | 2 | 2.295 | 5.285 | / |
| P9R2 | 3 | 0.915 | 4.655 | 5.505 |

TABLE 4

| | Number of arrest points | Arrest point position 1 |
|---|---|---|
| P1R1 | 0 | / |
| P1R2 | 0 | / |
| P2R1 | 0 | / |

TABLE 4-continued

| | Number of arrest points | Arrest point position 1 |
|---|---|---|
| P2R2 | 0 | / |
| P3R1 | 0 | / |
| P3R2 | 0 | / |
| P4R1 | 0 | / |
| P4R2 | 0 | / |
| P5R1 | 1 | 1.165 |
| P5R2 | 1 | 0.465 |
| P6R1 | 1 | 0.695 |
| P6R2 | 0 | / |
| P7R1 | 0 | / |
| P7R2 | 1 | 2.895 |
| P8R1 | 1 | 2.325 |
| P8R2 | 1 | 2.325 |
| P9R1 | 1 | 4.165 |
| P9R2 | 1 | 1.925 |

Figure 4:
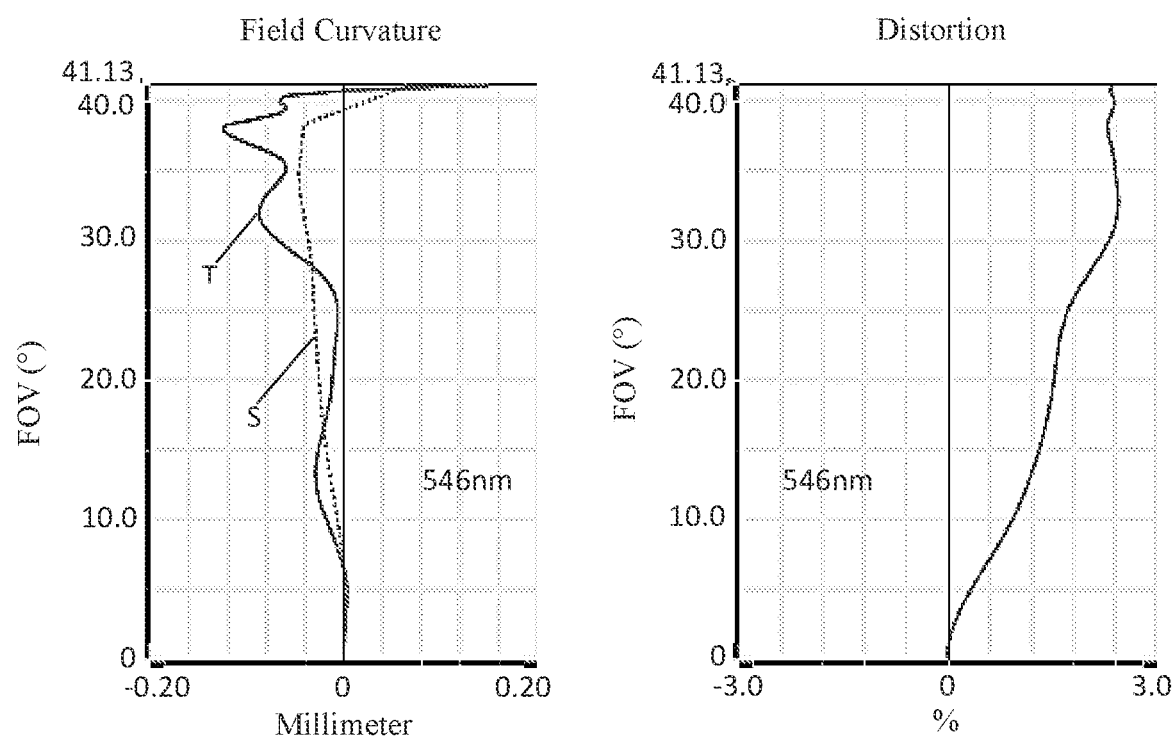
FIG. 4 is a schematic diagram of field curvature and distortion of the camera optical lens shown in FIG. 1.
Figure 5:
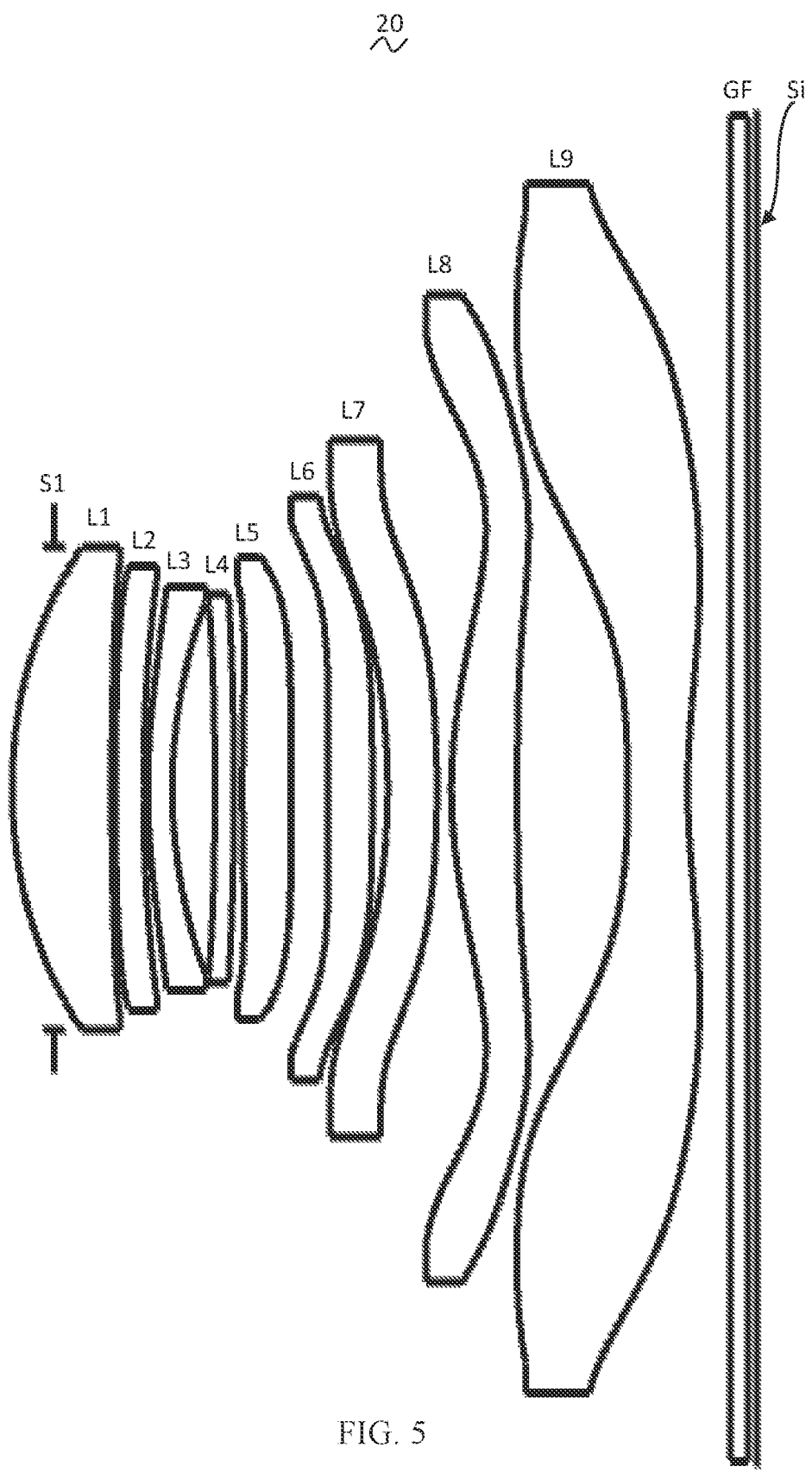
FIG. 5 is a schematic structural diagram of a camera optical lens according to Embodiment 2 of the present invention.

Table 2 and Table 3 illustrate schematic diagrams of longitudinal aberration and lateral color of light with wavelengths of 656 nm, 588 nm, 546 nm, 486 nm, and 436 nm after passing through the camera optical lens 10 in the Embodiment 1, respectively. FIG. 4 illustrates a schematic diagram of field curvature and distortion of light with a wavelength of 546 nm after passing through the camera optical lens 10 in the Embodiment 1, in which field curvature S is a field curvature in a sagittal direction, and field curvature T is a field curvature in a meridian direction.

Table 13 hereinafter indicates various values in Embodiments 1, 2, and 3 corresponding to parameters specified in the above conditions.

As shown in Table 13, the Embodiment 1 satisfies each of the above conditions.

In this embodiment, the camera optical lens 10 has an entrance pupil diameter (ENPD) of 4.205 mm, an image height IH of full field 6.017 mm, and the FOV (field of view) of 82.26° in a diagonal direction, such that the camera optical lens 10 meets design requirements for large aperture, wide angle and ultra-thinness while sufficiently correcting on-axis and off-axis chromatic aberration, thereby achieving excellent optical characteristics.

Embodiment 2

The Embodiment 2 is substantially the same as the Embodiment 1, and meanings of symbols in the Embodiment 2 are the same as those in the Embodiment 1. Only differences between them will be described below.

In this embodiment, the image side surface of the sixth lens L6 is a concave surface at the paraxial position.

Table 5 and Table 6 indicate design data of the camera optical lens 20 according to the Embodiment 2 of the present invention.

TABLE 5

| | R | d | nd | | vd | |
|---|---|---|---|---|---|---|
| S1 | ∞ | d0 = −0.491 | | | | |
| R1 | 3.196 | d1 = 1.166 | nd1 | 1.5916 | v1 | 51.39 |
| R2 | 19.441 | d2 = 0.047 | | | | |
| R3 | 25.788 | d3 = 0.328 | nd2 | 1.6032 | v2 | 28.29 |
| R4 | 16.344 | d4 = 0.051 | | | | |
| R5 | 4.766 | d5 = 0.290 | nd3 | 1.6800 | v3 | 18.40 |
| R6 | 3.192 | d6 = 0.504 | | | | |
| R7 | −23.161 | d7 = 0.228 | nd4 | 1.6800 | v4 | 18.40 |
| R8 | −22.876 | d8 = 0.095 | | | | |
| R9 | 18.769 | d9 = 0.572 | nd5 | 1.5441 | v5 | 55.93 |
| R10 | 70.201 | d10 = 0.435 | | | | |
| R11 | 19.916 | d11 = 0.521 | nd6 | 1.5441 | v6 | 55.93 |
| R12 | 298.041 | d12 = 0.184 | | | | |
| R13 | −4.412 | d13 = 0.581 | nd7 | 1.6359 | v7 | 23.82 |
| R14 | −7.891 | d14 = 0.168 | | | | |
| R15 | 3.360 | d15 = 0.775 | nd8 | 1.5441 | v8 | 55.93 |
| R16 | 47.146 | d16 = 1.304 | | | | |
| R17 | −7.767 | d17 = 0.705 | nd9 | 1.5441 | v9 | 55.93 |
| R18 | 4.596 | d18 = 0.500 | | | | |
| R19 | ∞ | d19 = 0.210 | ndg | 1.5168 | vg | 64.17 |
| R20 | ∞ | d20 = 0.111 | | | | |

Table 6 shows aspherical data of each lens in the camera optical lens 20 according to the Embodiment 2 of the present invention.

TABLE 6

| | Conic coefficient | Aspherical surface coefficient | | | | |
|---|---|---|---|---|---|---|
| | k | A4 | A6 | A8 | A10 | A12 |
| R1 | 1.1663E−01 | −1.6600E−03 | 2.5600E−03 | −2.3300E−03 | 1.1700E−03 | −3.1600E−04 |
| R2 | 3.1779E+01 | −3.3000E−03 | −1.0800E−02 | 1.3400E−02 | −6.5800E−03 | 1.5100E−03 |
| R3 | −5.9166E+01 | 9.6200E−03 | −1.6100E−02 | 1.2700E−02 | −2.4000E−03 | −1.8800E−03 |
| R4 | 1.1330E+01 | 3.1500E−02 | −3.1200E−02 | 7.8800E−03 | 1.3300E−02 | −1.5000E−02 |
| R5 | −8.0073E−01 | −3.1700E−03 | −1.1000E−02 | −1.1100E−02 | 2.9600E−02 | −2.5200E−02 |
| R6 | 1.5075E+00 | −2.7800E−02 | 1.4300E−02 | −2.5800E−02 | 3.0700E−02 | −2.1900E−02 |
| R7 | −1.5459E+01 | 4.1500E−03 | −8.9000E−03 | 8.7800E−03 | −8.0700E−03 | 6.0400E−03 |
| R8 | 8.2451E+00 | 4.7200E−03 | −7.7800E−03 | 5.6700E−03 | −2.6500E−03 | 1.2700E−03 |
| R9 | 8.6464E+01 | −6.0400E−03 | −1.6700E−02 | 2.7400E−02 | −2.8500E−02 | 1.8600E−02 |
| R10 | 9.3463E+02 | −1.9700E−02 | 7.8300E−03 | −7.0100E−03 | 3.6700E−03 | −1.4400E−03 |
| R11 | 2.1837E+01 | −3.7500E−02 | 1.9900E−02 | −1.4700E−02 | 8.1500E−03 | −3.0100E−03 |
| R12 | 5.9956E+02 | −3.5500E−02 | 1.6000E−02 | −1.4500E−02 | 7.7000E−03 | −2.2500E−03 |
| R13 | −6.9420E−02 | 1.6600E−02 | −1.0700E−02 | −1.6500E−03 | 2.8300E−03 | −9.6700E−04 |
| R14 | 4.2788E+00 | −2.2100E−03 | −1.0800E−02 | 6.3900E−03 | −2.1700E−03 | 4.7300E−04 |
| R15 | −6.7603E−01 | −1.8400E−02 | 2.2600E−03 | −3.8700E−04 | 2.7600E−06 | 5.1100E−06 |
| R16 | 8.0251E+00 | 1.6000E−02 | −4.1800E−03 | 5.7400E−04 | −8.6000E−05 | 1.0400E−05 |
| R17 | −3.3853E+00 | −3.2300E−02 | 5.3100E−03 | −4.7200E−04 | 3.7400E−05 | −2.6500E−06 |
| R18 | −6.2165E−01 | −3.2200E−02 | 5.5300E−03 | −7.9000E−04 | 8.1000E−05 | −5.5100E−06 |

TABLE 6-continued

| | Conic coefficient | Aspherical surface coefficient | | | |
|---|---|---|---|---|---|
| | k | A14 | A16 | A18 | A20 |
| R1 | 1.1663E-01 | 3.0500E-05 | 5.2600E-06 | -1.6300E-06 | 1.2100E-07 |
| R2 | 3.1779E+01 | -6.6700E-05 | -4.3400E-05 | 8.9200E-06 | -5.2900E-07 |
| R3 | -5.9166E+01 | 1.3400E-03 | -3.7100E-04 | 4.9700E-05 | -2.6100E-06 |
| R4 | 1.1330E+01 | 7.3600E-03 | -1.9700E-03 | 2.8100E-04 | -1.6500E-05 |
| R5 | -8.0073E-01 | 1.1700E-02 | -3.1400E-03 | 4.5900E-04 | -2.8100E-05 |
| R6 | 1.5075E+00 | 9.5900E-03 | -2.5600E-03 | 3.8300E-04 | -2.4600E-05 |
| R7 | -1.5459E+01 | -3.1700E-03 | 1.0200E-03 | -1.7700E-04 | 1.2400E-05 |
| R8 | 8.2451E+00 | -6.8600E-04 | 2.5500E-04 | -4.9000E-05 | 3.7100E-06 |
| R9 | 8.6464E+01 | -7.6900E-03 | 1.9500E-03 | -2.7500E-04 | 1.6600E-05 |
| R10 | 9.3463E+02 | 3.9800E-04 | -7.3500E-05 | 8.2300E-06 | -4.4000E-07 |
| R11 | 2.1837E+01 | 6.3000E-04 | -8.1900E-05 | 5.2400E-06 | -1.3800E-07 |
| R12 | 5.9956E+02 | 3.5900E-04 | -2.8900E-05 | 8.4100E-07 | 7.3400E-09 |
| R13 | -6.9420E-02 | 1.7200E-04 | -1.7400E-05 | 9.5200E-07 | -2.1700E-08 |
| R14 | 4.2788E+00 | -6.3100E-05 | 4.9400E-06 | -2.0800E-07 | 3.6900E-09 |
| R15 | -6.7603E-01 | -5.3500E-07 | 2.4300E-08 | -5.3400E-10 | 4.6000E-12 |
| R16 | 8.0251E+00 | -7.5200E-07 | 3.0400E-08 | -6.3300E-10 | 5.2700E-12 |
| R17 | -3.3853E+00 | 1.3400E-07 | -4.1300E-09 | 6.9700E-11 | -4.9400E-13 |
| R18 | -6.2165E-01 | 2.3800E-07 | -6.2200E-09 | 9.0300E-11 | -5.5800E-13 |

Table 7 and Table 8 indicate design data of the inflexion points and arrest points of each lens in the camera optical lens 20 according to the Embodiment 2 of the present invention.

TABLE 7

| | Number of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 2 | 1.485 | 1.755 | / |
| P3R2 | 0 | / | / | / |
| P4R1 | 0 | / | / | / |
| P4R2 | 1 | 1.605 | / | / |
| P5R1 | 1 | 0.675 | / | / |
| P5R2 | 1 | 0.265 | / | / |
| P6R1 | 3 | 0.365 | 2.075 | 2.355 |
| P6R2 | 3 | 0.095 | 2.125 | 2.585 |
| P7R1 | 1 | 1.815 | / | / |
| P7R2 | 1 | 2.025 | / | / |
| P8R1 | 2 | 1.425 | 3.315 | / |
| P8R2 | 2 | 1.645 | 4.315 | / |
| P9R1 | 2 | 2.295 | 5.275 | / |
| P9R2 | 3 | 0.895 | 4.645 | 5.485 |

TABLE 8

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 1 | 1.145 |
| P5R2 | 1 | 0.455 |
| P6R1 | 1 | 0.665 |
| P6R2 | 1 | 0.155 |
| P7R1 | 0 | / |
| P7R2 | 1 | 2.975 |
| P8R1 | 1 | 2.315 |
| P8R2 | 1 | 2.295 |
| P9R1 | 1 | 4.165 |
| P9R2 | 1 | 1.885 |

Figure 6:
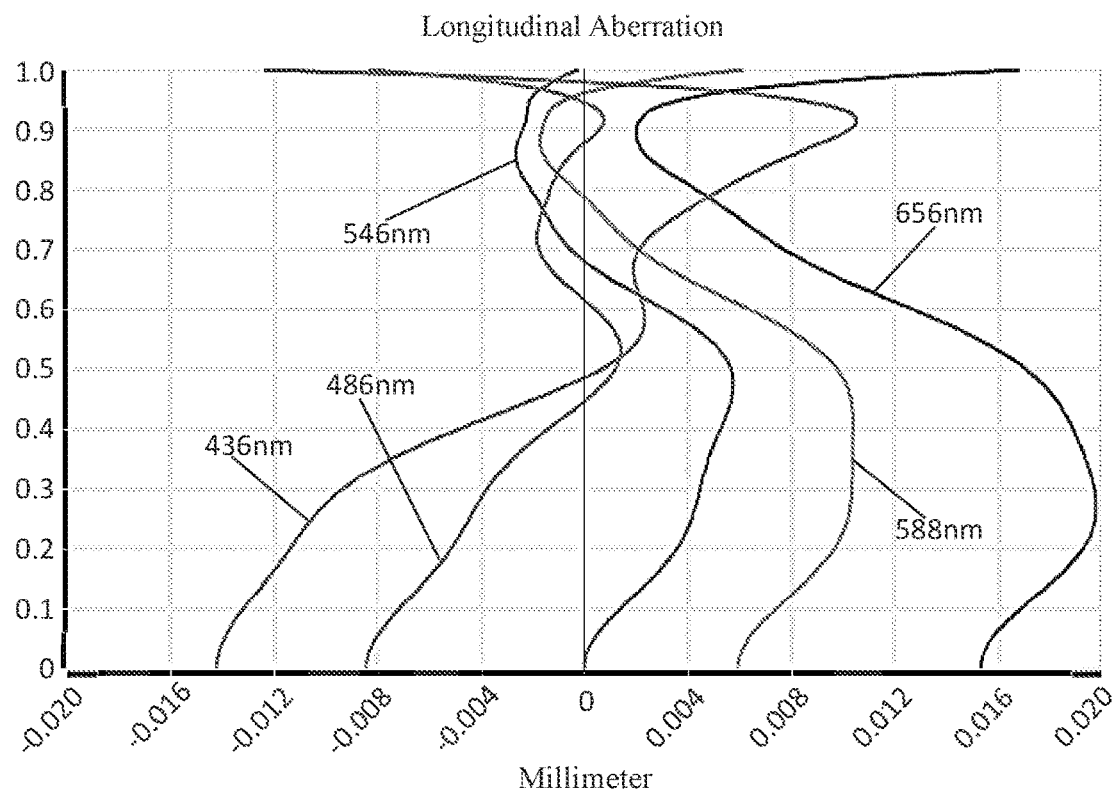
FIG. 6 is a schematic diagram of longitudinal aberration of the camera optical lens shown in FIG. 5.
Figure 7:
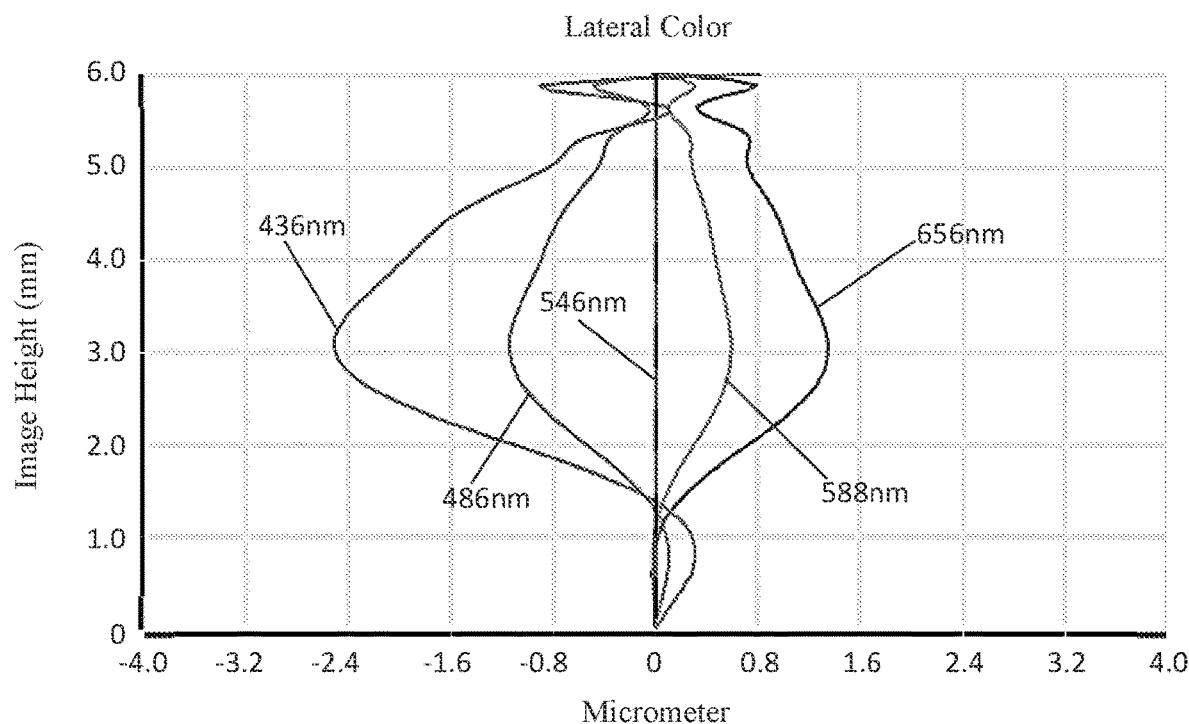
FIG. 7 is a schematic diagram of lateral color of the camera optical lens shown in FIG. 5.
Figure 8:
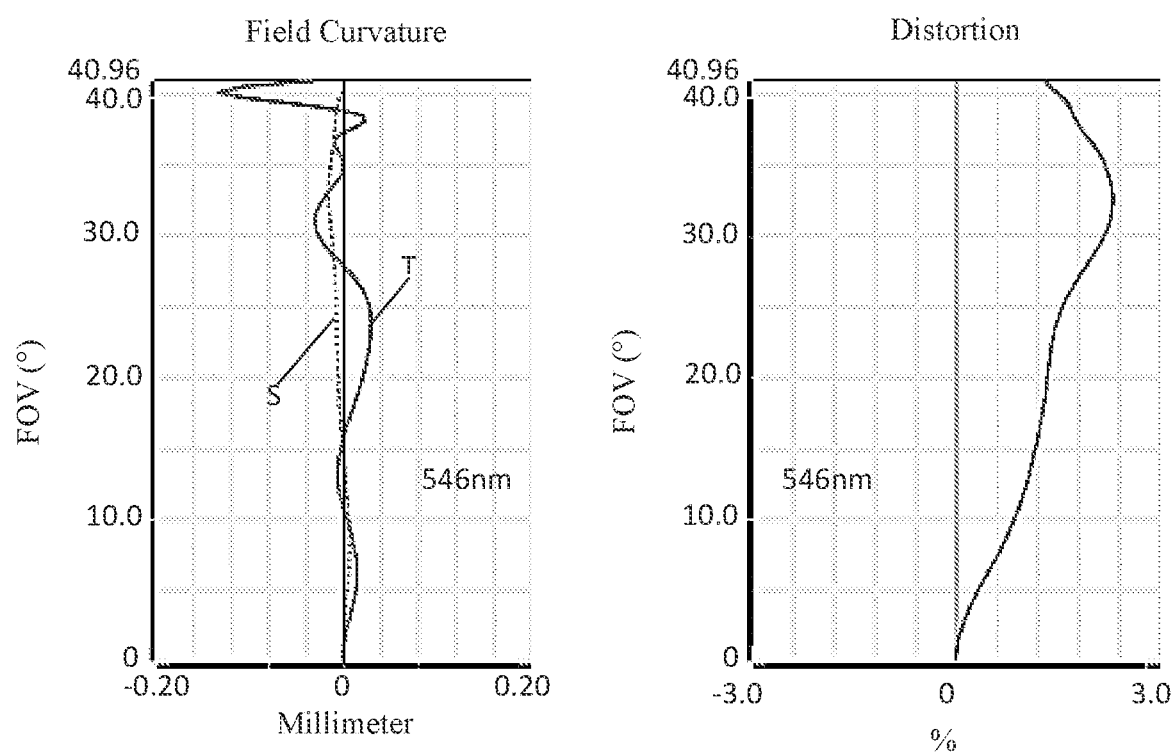
FIG. 8 is a schematic diagram of field curvature and distortion of the camera optical lens shown in FIG. 5.
Figure 9:
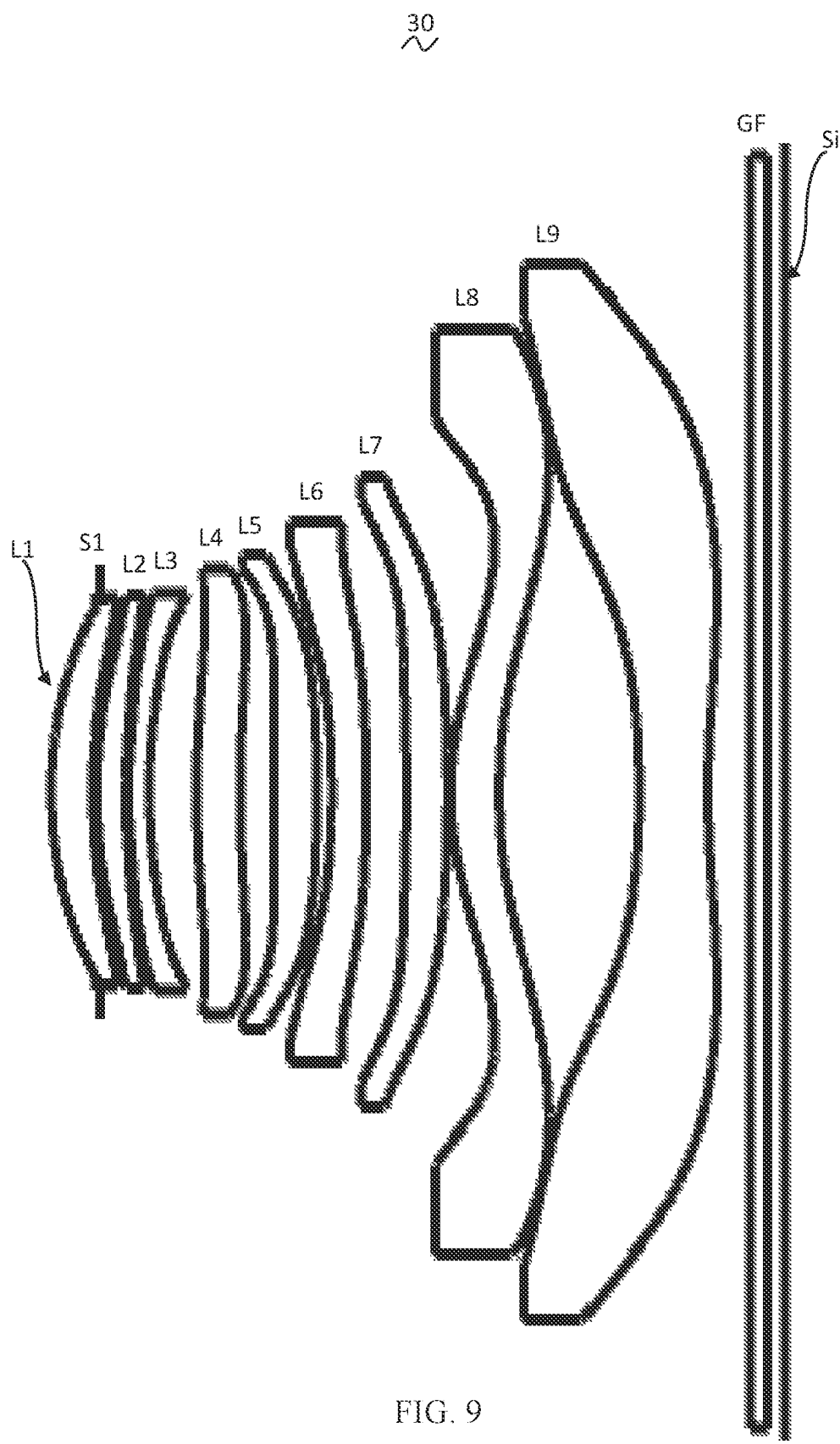
FIG. 9 is a schematic structural diagram of a camera optical lens according to Embodiment 3 of the present invention.
Figure 10:
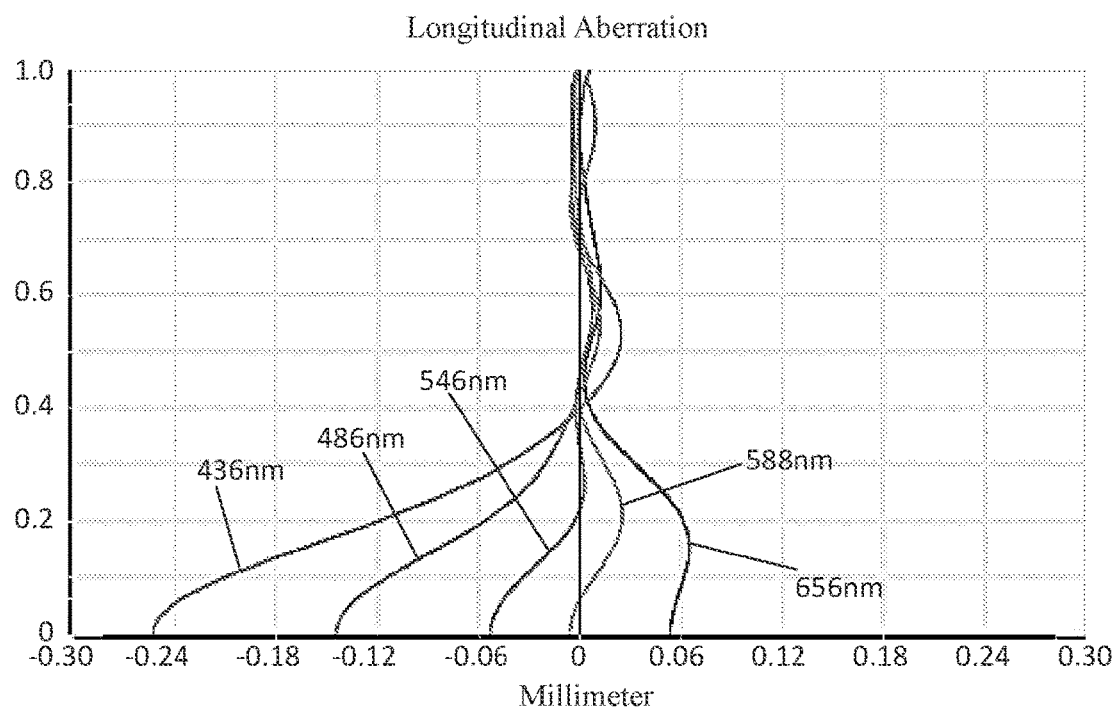
FIG. 10 is a schematic diagram of longitudinal aberration of the camera optical lens shown in FIG. 9.
Figure 11:
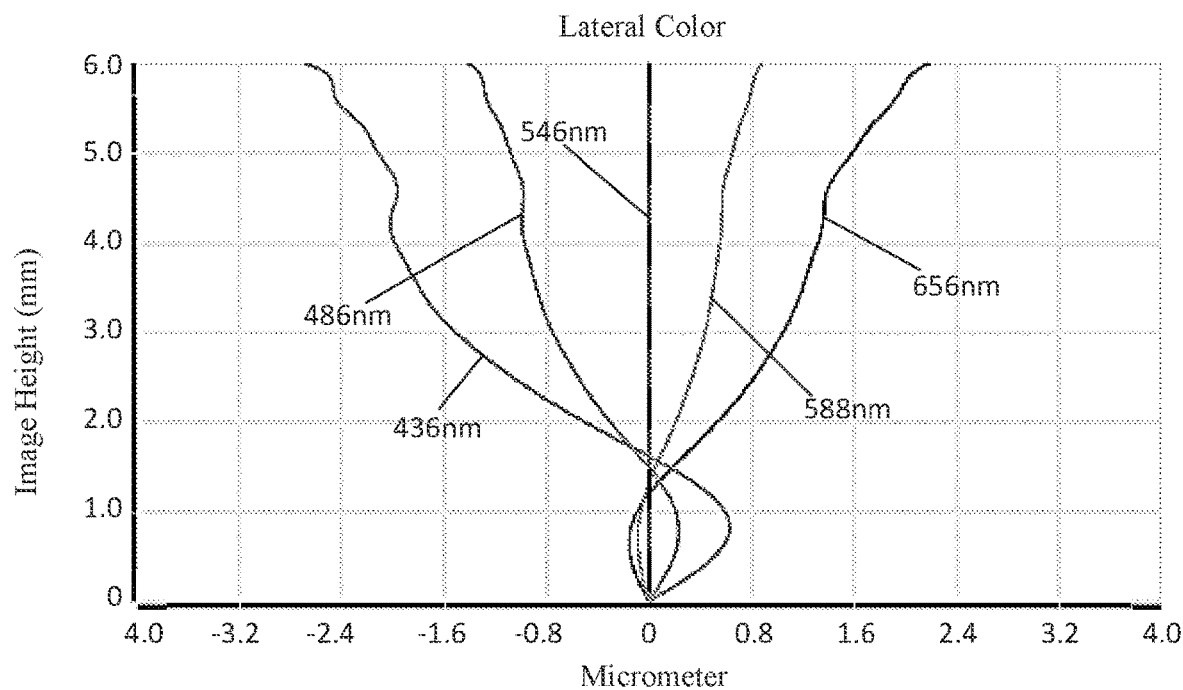
FIG. 11 is a schematic diagram of lateral color of the camera optical lens shown in FIG. 9.

FIG. 6 and FIG. 7 illustrate schematic diagrams of longitudinal aberration and lateral color of light with wavelengths of 656 nm, 588 nm, 546 nm, 486 nm, and 436 nm after passing through the camera optical lens 20 in the Embodiment 2, respectively. FIG. 8 illustrates a schematic diagram of field curvature and distortion of a light with a wavelength of 546 nm after passing through the camera optical lens 20 in the Embodiment 2.

As shown in Table 13, the Embodiment 2 satisfies each of the above conditions.

In this embodiment, the camera optical lens 20 has an entrance pupil diameter (ENPD) of 4.277 mm, an image height IH of full field of 6.017 mm, and the field of view (FOV) of 81.92° in a diagonal direction, such that the camera optical lens 20 meets design requirements for large aperture, wide angle and ultra-thinness while sufficiently correcting on-axis and off-axis chromatic aberration, thereby achieving excellent optical characteristics.

Embodiment 3

The Embodiment 3 is substantially the same as the Embodiment 1, and meanings of the symbols are the same as those in the Embodiment 1. Only differences therebetween will be described below.

In this embodiment, the object side surface of the fourth lens L4 is a convex surface at the paraxial position, and its image side surface is a concave surface at the paraxial position; the image side surface of the fifth lens L5 is a convex surface at the paraxial position; the object side surface of the sixth lens L6 is a concave surface at the paraxial position; the third lens L3 has positive refraction power, and the sixth lens L6 has negative refraction power.

Table 9 and Table 10 illustrate design data of the camera optical lens 30 according to the Embodiment 3 of the present invention.

TABLE 9

| | R | d | | nd | | vd |
|---|---|---|---|---|---|---|
| S1 | ∞ | d0 = −0.585 | | | | |
| R1 | 3.155 | d1 = 0.491 | nd1 | 1.5444 | v1 | 56.43 |
| R2 | 5.005 | d2 = 0.055 | | | | |
| R3 | 4.049 | d3 = 0.333 | nd2 | 1.5444 | v2 | 56.43 |
| R4 | 2.640 | d4 = 0.045 | | | | |
| R5 | 2.447 | d5 = 0.248 | nd3 | 1.6800 | v3 | 18.40 |
| R6 | 3.388 | d6 = 0.568 | | | | |
| R7 | 6.558 | d7 = 0.523 | nd4 | 1.5444 | v4 | 56.43 |
| R8 | 7.766 | d8 = 0.405 | | | | |
| R9 | 31.607 | d9 = 0.515 | nd5 | 1.5510 | v5 | 45.00 |
| R10 | −8.78 | d10 = 0.180 | | | | |
| R11 | −5.419 | d11 = 0.408 | nd6 | 1.6610 | v6 | 20.53 |
| R12 | −15.813 | d12 = 0.487 | | | | |
| R13 | −9.439 | d13 = 0.487 | nd7 | 1.5661 | v7 | 37.70 |
| R14 | −13.171 | d14 = 0.041 | | | | |
| R15 | 2.341 | d15 = 0.581 | nd8 | 1.5444 | v8 | 56.43 |
| R16 | 4.346 | d16 = 1.676 | | | | |
| R17 | −7.570 | d17 = 0.822 | nd9 | 1.5444 | v9 | 56.43 |
| R18 | 5.878 | d18 = 0.500 | | | | |
| R19 | ∞ | d19 = 0.210 | ndg | 1.5168 | vg | 64.17 |
| R20 | ∞ | d20 = 0.212 | | | | |

Table 10 illustrates aspherical surface data of each lens in the camera optical lens 30 according to the Embodiment 3 of the present invention.

Table 11 and Table 12 illustrate design data of the inflexion points and arrest points of each lens in the camera optical lens 30 according to the Embodiment 3 of the present invention.

TABLE 11

| | Number of inflexion points | Inflexion point position 1 | Inflexion point position 2 | Inflexion point position 3 | Inflexion point position 4 |
|---|---|---|---|---|---|
| P1R1 | 0 | / | / | / | / |
| P1R2 | 0 | / | / | / | / |
| P2R1 | 2 | 1.235 | 1.625 | / | / |
| P2R2 | 4 | 0.435 | 0.655 | 1.265 | 1.485 |
| P3R1 | 3 | 0.445 | 0.685 | 1.835 | / |
| P3R2 | 0 | / | / | / | / |
| P4R1 | 1 | 1.005 | / | / | / |
| P4R2 | 1 | 0.845 | / | / | / |
| P5R1 | 2 | 0.525 | 2.035 | / | / |
| P5R2 | 1 | 1.995 | / | / | / |
| P6R1 | 2 | 1.675 | 2.065 | / | / |
| P6R2 | 1 | 1.765 | / | / | / |
| P7R1 | 3 | 0.575 | 0.925 | 2.505 | / |
| P7R2 | 2 | 2.485 | 2.845 | / | / |
| P8R1 | 3 | 1.245 | 3.185 | 3.345 | / |
| P8R2 | 1 | 1.535 | / | / | / |

TABLE 10

| | Conic coefficient | Aspherical surface coefficient | | | | |
|---|---|---|---|---|---|---|
| | k | A4 | A6 | A8 | A10 | A12 |
| R1 | 2.3828E−01 | 7.9836E−03 | −5.9588E−03 | 2.3962E−03 | −4.6160E−04 | 3.3164E−05 |
| R2 | −1.6983E+00 | 2.9598E−02 | −1.6199E−02 | −3.4433E−03 | 5.0309E−03 | −1.6663E−03 |
| R3 | −5.7506E+00 | 1.7936E−02 | 5.1040E−03 | −1.1682E−02 | 4.4970E−03 | −7.5701E−04 |
| R4 | −9.0700E+00 | −2.4134E−01 | 3.0215E−01 | −1.7409E−01 | 5.0138E−02 | −6.2315E−03 |
| R5 | −4.8666E+00 | −2.7540E−01 | 3.2475E−01 | −1.9097E−01 | 6.1302E−02 | −1.0102E−02 |
| R6 | 1.2354E+00 | −9.6797E−02 | 9.5541E−02 | −5.5419E−02 | 1.8294E−02 | −3.1055E−03 |
| R7 | −2.6238E+00 | −1.7957E−02 | 1.6948E−03 | 3.8526E−03 | −3.8884E−03 | 1.4998E−03 |
| R8 | 5.8795E+00 | −1.6908E−02 | −5.2993E−03 | 7.6657E−03 | −4.6641E−03 | 1.4323E−03 |
| R9 | −2.0225E+01 | 7.9906E−03 | −4.1720E−02 | 4.0876E−02 | −2.5360E−02 | 9.8458E−03 |
| R10 | −1.2706E+01 | 4.1931E−02 | −8.2679E−02 | 5.9292E−02 | −2.5515E−02 | 6.7701E−03 |
| R11 | 1.8460E+00 | 3.5564E−02 | −7.1163E−02 | 4.8663E−02 | −1.4580E−02 | 5.6588E−04 |
| R12 | 1.3658E−01 | −3.4755E−03 | −1.7950E−02 | 1.1557E−02 | −2.6621E−03 | −7.3407E−05 |
| R13 | −1.4554E+00 | 3.9186E−02 | −1.4308E−02 | −2.4965E−03 | 3.3713E−03 | −1.2374E−03 |
| R14 | 1.3336E+01 | 7.2987E−04 | −1.6563E−03 | −1.1526E−03 | 7.4047E−04 | −1.8983E−04 |
| R15 | −8.6365E−01 | −2.3832E−02 | −2.5812E−03 | 1.4303E−03 | −3.3939E−04 | 5.7455E−05 |
| R16 | −6.3083E+00 | 3.2969E−02 | −1.8606E−02 | 5.0964E−03 | −8.6059E−04 | 9.2340E−05 |
| R17 | −2.7839E+01 | −2.9395E−02 | 6.1176E−03 | −1.4146E−03 | 2.7840E−04 | −3.2806E−05 |
| R18 | −1.2693E+00 | −2.5748E−02 | 5.0569E−03 | −8.9574E−04 | 1.1314E−04 | −9.4426E−06 |

| | Conic coefficient | Aspherical surface coefficient | | | |
|---|---|---|---|---|---|
| | k | A14 | A16 | A18 | A20 |
| R1 | 2.3828E−01 | −5.2424E−07 | 3.1070E−07 | 4.8299E−08 | −2.5353E−08 |
| R2 | −1.6983E+00 | 2.3565E−04 | −1.1610E−05 | 1.6310E−08 | 1.3868E−08 |
| R3 | −5.7506E+00 | 5.5956E−05 | −3.8884E−07 | 1.7589E−07 | −7.8049E−09 |
| R4 | −9.0700E+00 | 1.6266E−05 | 4.3682E−05 | −1.1707E−07 | 3.0096E−08 |
| R5 | −4.8666E+00 | 6.6807E−04 | −6.8041E−07 | 7.3868E−08 | 9.7604E−10 |
| R6 | 1.2354E+00 | 2.1071E−04 | −2.3622E−07 | −2.7417E−08 | 1.4468E−09 |
| R7 | −2.6238E+00 | −2.6764E−04 | 1.8350E−05 | −4.8359E−08 | −4.3845E−10 |
| R8 | 5.8795E+00 | −2.2927E−04 | 1.4730E−05 | −3.2935E−08 | −9.3951E−09 |
| R9 | −2.0225E+01 | −2.3368E−03 | 3.0345E−04 | −1.6212E−05 | −7.4553E−10 |
| R10 | −1.2706E+01 | −1.1061E−03 | 1.0401E−04 | −4.3066E−06 | 4.3103E−10 |
| R11 | 1.8460E+00 | 8.9877E−04 | −2.6267E−04 | 3.0710E−05 | −1.3546E−06 |
| R12 | 1.3658E−01 | 1.7174E−04 | −3.7104E−05 | 3.4385E−06 | −1.2168E−07 |
| R13 | −1.4554E+00 | 2.4477E−04 | −2.7895E−05 | 1.7290E−06 | −4.5266E−08 |
| R14 | 1.3336E+01 | 2.5161E−05 | −1.6465E−06 | 4.0918E−08 | 5.9210E−11 |
| R15 | −8.6365E−01 | −7.6884E−06 | 6.8135E−07 | −3.2534E−08 | 6.2213E−10 |
| R16 | −6.3083E+00 | −6.2848E−06 | 2.6212E−07 | −6.0976E−09 | 6.0470E−11 |
| R17 | −2.7839E+01 | 2.2468E−06 | −8.8838E−08 | 1.8887E−09 | −1.6754E−11 |
| R18 | −1.2693E+00 | 4.9642E−07 | −1.5647E−08 | 2.6881E−10 | −1.9304E−12 |

TABLE 11-continued

| | Number of inflexion points | Inflexion point position 1 | Inflexion point position 2 | Inflexion point position 3 | Inflexion point position 4 |
|---|---|---|---|---|---|
| P9R1 | 4 | 2.275 | 3.485 | 3.795 | 4.015 |
| P9R2 | 1 | 0.885 | / | / | / |

TABLE 12

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 1.645 |
| P4R2 | 1 | 1.425 |
| P5R1 | 1 | 0.825 |
| P5R2 | 0 | / |
| P6R1 | 0 | / |
| P6R2 | 1 | 2.405 |
| P7R1 | 0 | / |
| P7R2 | 0 | / |
| P8R1 | 1 | 2.295 |
| P8R2 | 1 | 3.005 |
| P9R1 | 0 | / |
| P9R2 | 1 | 1.805 |

Figure 12:
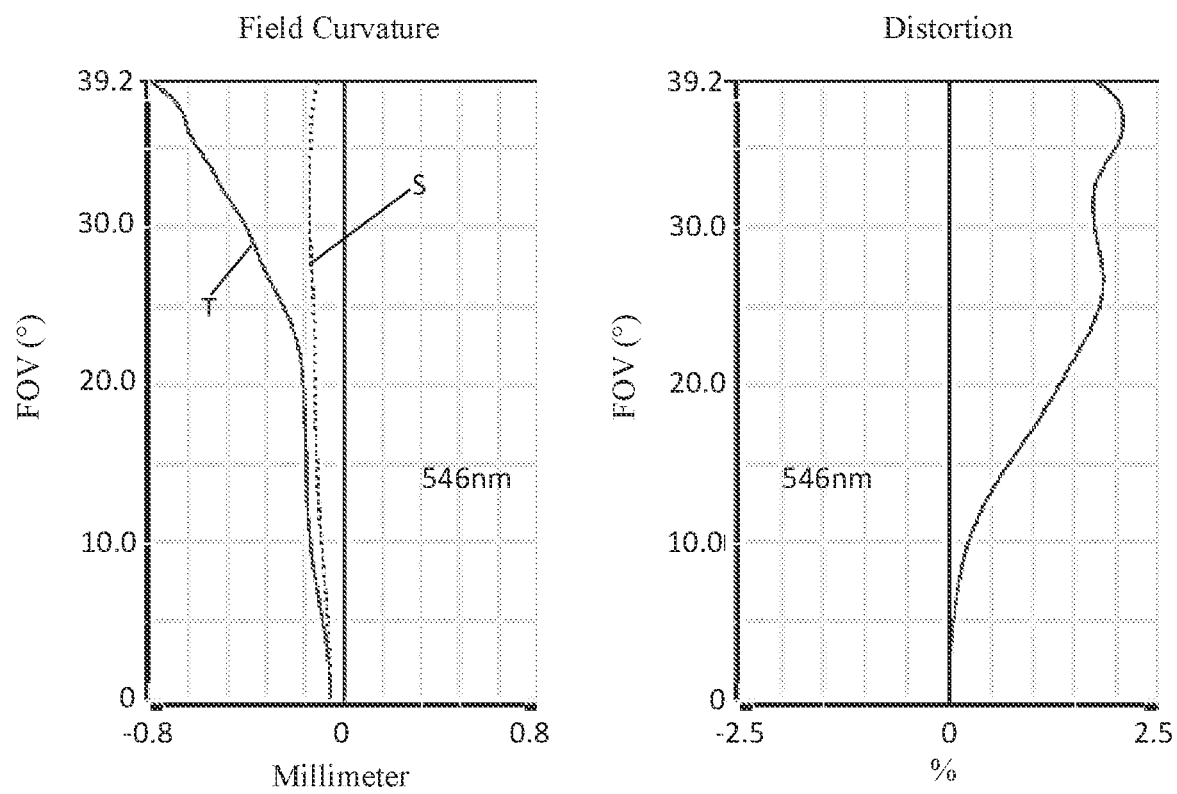
FIG. 12 is a schematic diagram of field curvature and distortion of the camera optical lens shown in FIG. 9.

Table 10 and Table 11 illustrate schematic diagrams of longitudinal aberration and lateral color of light with wavelengths of 656 nm, 588 nm, 546 nm, 486 nm, and 436 nm after passing through the camera optical lens 30 according to the Embodiment 3, respectively. FIG. 12 illustrates a schematic diagram of field curvature and distortion of light with a wavelength of 546 nm after passing through the camera optical lens 30 according to the Embodiment 3.

The following Table 13 includes values corresponding to the above conditions in this embodiment according to the above conditions. It is apparent that the camera optical lens 30 in this embodiment satisfies the above conditions.

In this embodiment, the camera optical lens 30 has an entrance pupil diameter ENPD of 3.570 mm, an image height IH of full field of view of 6.000 mm, the FOV (field of view) of 78.39° in a diagonal direction, such that the camera optical lens 30 meets design requirements for large aperture, wide angle and ultra-thinness while sufficiently correcting on-axis and off-axis chromatic aberration, thereby achieving excellent optical characteristics.

TABLE 13

| Parameters and conditions | Embodiment 1 | Embodiment 2 | Embodiment 3 |
|---|---|---|---|
| f1/f | 1.06 | 0.92 | 2.00 |
| d13/d14 | 2.50 | 3.46 | 11.88 |
| f | 6.729 | 6.843 | 7.139 |
| f1 | 7.122 | 6.268 | 14.278 |
| f2 | −1106.676 | −74.359 | −15.142 |
| f3 | −16.885 | −15.183 | 11.544 |
| f4 | 11005.680 | 2039.046 | 66.882 |
| f5 | 47.942 | 46.699 | 12.461 |
| f6 | 30.129 | 39.032 | −12.528 |
| f7 | −17.860 | −16.671 | −61.374 |
| f8 | 6.551 | 6.580 | 8.417 |
| f9 | −5.000 | −5.180 | −5.924 |
| FNO | 1.60 | 1.60 | 2.00 |
| TTL | 8.789 | 8.775 | 8.787 |

TABLE 13-continued

| Parameters and conditions | Embodiment 1 | Embodiment 2 | Embodiment 3 |
|---|---|---|---|
| IH | 6.017 | 6.017 | 6.000 |
| FOV | 82.26° | 81.92° | 78.39° |

The above are only the embodiments of the present invention. It should be understand that those skilled in the art can make improvements without departing from the inventive concept of the present invention, and these improvements shall all belong to the scope of the present invention.

What is claimed is:

1. A camera optical lens, comprising, from an object side to an image side:
   a first lens having positive refractive power;
   a second lens having negative refractive power;
   a third lens;
   a fourth lens having positive refractive power;
   a fifth lens having positive refractive power;
   a sixth lens;
   a seventh lens having negative refractive power;
   an eighth lens having positive refractive power; and
   a ninth lens having negative refractive power,
   wherein the camera optical lens satisfies the following conditions:

$0.90 \leq f1/f \leq 2.00$;

$0.50 \leq f5/f \leq 7.50$;

$-4.09 \leq (R11+R12)/(R11-R12) \leq -0.51$; and $2.50 \leq d13/d14 \leq 12.00$, where
   f denotes a focal length of the camera optical lens,
   f1 denotes a focal length of the first lens,
   f5 denotes a focal length of the fifth lens,
   R11 denotes a central curvature radius of an object side surface of the sixth lens,
   R12 denotes a central curvature radius of an image side surface of the sixth lens,
   d13 denotes an on-axis thickness of the seventh lens, and
   d14 denotes an on-axis distance from an image side surface of the seventh lens to an object side surface of the eighth lens.

2. The camera optical lens as described in claim 1, further satisfying following conditions:

$-8.82 \leq (R1+R2)/(R1-R2) \leq -0.93$; and $0.03 \leq d1/TTL \leq 0.20$, where
   R1 denotes a central curvature radius of an object side surface of the first lens,
   R2 denotes a central curvature radius of an image side surface of the first lens,
   d1 denotes an on-axis thickness of the first lens, and
   TTL denotes a total optical length from the object side surface of the first lens to an image plane of the camera optical lens along an optic axis.

3. The camera optical lens as described in claim 1, further satisfying the following conditions:

$-328.93 \leq f2/f \leq 1.41$;

$2.23 \leq (R3+R4)/(R3-R4) \leq 85.16$; and $0.02 \leq d3/TTL \leq 0.06$, where f2 denotes a focal length of the second lens, R3 denotes a central curvature radius of an object side surface of the second lens, R4 denotes a central curvature radius of an image side surface of the second lens, d3 denotes an on-axis thickness of the second lens, and TTL denotes the total optical length from the object side surface of the first lens to the image plane of the camera optical lens along the optic axis.

4. The camera optical lens as described in claim 1, further satisfying the following conditions:

$-5.02 \leq f3/f \leq 2.43;$ $-12.40 \leq (R5+R6)/(R5-R6) \leq 8.18;$ and $0.01 \leq d5/TTL \leq 0.07,$ where f3 denotes a focal length of the third lens, R5 denotes a central curvature radius of an object side surface of the third lens, R6 denotes a central curvature radius of an image side surface of the third lens, d5 denotes an on-axis thickness of the third lens, and TTL denotes the total optical length from the object side surface of the first lens to the image plane of the camera optical lens along the optic axis.

5. The camera optical lens as described in claim 1, further satisfying the following conditions:

$3.68 \leq f4/f \leq 2453.34;$ $-3630.80 \leq (R7+R8)/(R7-R8) \leq 242.30;$ and $0.01 \leq d7/TTL \leq 0.09,$ where f4 denotes a focal length of the fourth lens, R7 denotes a central curvature radius of an object side surface of the fourth lens, R8 denotes a central curvature radius of an image side surface of the fourth lens, d7 denotes an on-axis thickness of the fourth lens, and TTL denotes the total optical length from the object side surface of the first lens to the image plane of the camera optical lens along the optic axis.

6. The camera optical lens as described in claim 1, further satisfying the following conditions:

$-3.59 \leq (R9+R10)/(R9-R10) \leq 0.85;$ and $0.03 \leq d9/TTL \leq 0.10,$ where R9 denotes a central curvature radius of an object side surface of the fifth lens, R10 denotes a central curvature radius of an image side surface of the fifth lens, d9 denotes an on-axis thickness of the fifth lens, and TTL denotes the total optical length from the object side surface of the first lens to the image plane of the camera optical lens along the optic axis.

7. The camera optical lens as described in claim 1, further satisfying the following conditions:

$-3.51 \leq f6/f \leq 8.56;$ and $0.02 \leq d11/TTL \leq 0.09,$ where f6 denotes a focal length of the sixth lens, d11 denotes an on-axis thickness of the sixth lens, and TTL denotes the total optical length from the object side surface of the first lens to the image plane of the camera optical lens along the optic axis.

8. The camera optical lens as described in claim 1, further satisfying the following conditions:

$-17.19 \leq f7/f \leq -1.62;$ $-12.12 \leq (R13+R14)/(R13-R14) \leq -2.36;$ and $0.03 \leq d13/TTL \leq 0.10,$ where f7 denotes a focal length of the seventh lens, R13 denotes a central curvature radius of an object side surface of the seventh lens, R14 denotes a central curvature radius of the image side surface of the seventh lens, and TTL denotes the total optical length from the object side surface of the first lens to the image plane of the camera optical lens along the optic axis.

9. The camera optical lens as described in claim 1, further satisfying the following conditions:

$0.48 \leq f8/f \leq 1.77,$ $-6.67 \leq (R15+R16)/(R15-R16) \leq -0.76;$ and $0.03 \leq d15/TTL \leq 0.14,$ where f8 denotes a focal length of the eighth lens, R15 denotes a central curvature radius of the object side surface of the eighth lens, R16 denotes a central curvature radius of an image side surface of the eighth lens, d15 denotes an on-axis thickness of the eighth lens, and TTL denotes the total optical length from the object side surface of the first lens to the image plane of the camera optical lens along the optic axis.

10. The camera optical lens as described in claim 1, further satisfying the following conditions:

$-1.66 \leq f9/f \leq -0.50;$ $0.06(R17+R18)/(R17-R18) \leq 0.38;$ and $0.04 \leq d17/TTL \leq 0.14,$ where f9 denotes a focal length of the ninth lens, R17 denotes a central curvature radius of an object side surface of the ninth lens, R18 denotes a central curvature radius of an image side surface of the ninth lens, d17 denotes an on-axis thickness of the ninth lens, and TTL denotes the total optical length from the object side surface of the first lens to the image plane of the camera optical lens along the optic axis.

* * * * *